(12) United States Patent
Azami

(10) Patent No.: US 7,580,957 B2
(45) Date of Patent: Aug. 25, 2009

(54) STRUCTURED DATA STORAGE DEVICE AND STRUCTURED DATA STORAGE METHOD

(75) Inventor: Tomohiro Azami, Kanagawa-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 275 days.

(21) Appl. No.: 11/699,345

(22) Filed: Jan. 30, 2007

(65) Prior Publication Data

US 2007/0179996 A1    Aug. 2, 2007

(30) Foreign Application Priority Data

| Jan. 31, 2006 | (JP) | ............................ P2006-023129 |
| Feb. 28, 2006 | (JP) | ............................ P2006-052134 |
| Nov. 30, 2006 | (JP) | ............................ P2006-323130 |

(51) Int. Cl.
  G06F 7/00    (2006.01)
  G06F 17/30   (2006.01)
  G06F 17/00   (2006.01)
  G06F 12/00   (2006.01)

(52) U.S. Cl. ........................... 707/200; 707/1; 707/102

(58) Field of Classification Search ................. 707/1–4, 707/6, 100–102, 200, 10
See application file for complete search history.

(56) References Cited

U.S. PATENT DOCUMENTS

| 6,175,835 | B1 * | 1/2001 | Shadmon ..................... 707/102 |
| 6,278,992 | B1 * | 8/2001 | Curtis et al. .................... 707/3 |
| 6,721,490 | B1 * | 4/2004 | Yao et al. ...................... 386/69 |
| 7,287,068 | B1 * | 10/2007 | Eriksson et al. ............. 709/221 |
| 2007/0203938 | A1 * | 8/2007 | Prahlad et al. .............. 707/102 |

FOREIGN PATENT DOCUMENTS

JP          2004-178084       6/2004

\* cited by examiner

*Primary Examiner*—Don Wong
*Assistant Examiner*—Merilyn P Nguyen
(74) *Attorney, Agent, or Firm*—The Nath Law Group; Jerald L. Meyer; Stanley N. Protigal

(57) ABSTRACT

Structured data is stored into a structured data file, which is a text file. Index information is generated to speed up searching or updating of the structured data and stored into an index file, which is a binary file. When a general-purpose structured data processor on an external device side updated the content of the structured data file, a dedicated structured data processor detects that the structured data file has been updated and analyzes the updated structured data file. Subsequently, the dedicated structured data processor generates new index information relating to the structured data having the analyzed structured data file to update the index file using the new index information.

24 Claims, 20 Drawing Sheets

| PositionPath {                          | Number of bits |
|-----------------------------------------|----------------|
| NumOfPositions                          | 32             |
| for (i = 0 ; i < NumOfPositions; i++) { |                |
| Positions [i]                           | 16             |
| }                                       |                |
| }                                       |                |

FIG. 15

```
1    <SDVideo>
2         <Movie id="001-001">
3              <Event>11</Event>
4              <Quality>1</Quality>
5              <Date>2006-01-01T11:02:50</Date>
6         <Movie>
7         <Movie id="001-002">
8              <Event>23</Event>
9              <Quality>3</Quality>
10             <Date>2006-01-01T15:36:12</Date>
11        <Movie>
12        <!--DELETED-->
13        <Movie id="001-003">
14             <Event>22</Event>
15             <Quality>2</Quality>
16             <Date>2006-01-02T09:13:45</Date>
17        <Movie>
18   </SDVideo>
```

XML DATA

FIG. 21

ATHLETIC MEETING 2006.10.05

2006.10.06

2006.10.07

2006.10.08

MOTION PICTURE 1

MOTION PICTURE 2

MOTION PICTURE 3

STRUCTURED DATA STORAGE DEVICE AND STRUCTURED DATA STORAGE METHOD

BACKGROUND OF THE INVENTION

1. Field of the Invention

The present invention relates to a structured data storage device and a structured data storage method, which realize a high-speed search using index information for databases of structured data represented by XML (extensible Markup Language), and which permit viewing and editing of structured data provided as text files.

2. Description of the Related Art

Structured data according to the XML format can be cited as a data format with high versatility and extensibility. In a variety of fields, data is managed as structured data according to the XML format. XML, which is one type of markup languages that provide documents with tags, can express data in a structured manner and is highly recognizable. On the other hand, the method of storing data must be elaborated for a high-speed data search.

A conventional storage method of XML data is disclosed in the bulletin of Japanese Patent No. 3560043. According to the method, XML data is stored in a tabular table. Specifically, one table is created for each of elements based on the schema information of the XML data, and then the content and attribute of the element are stored into the created table, as well as the order of appearance and parent-child relationship of the element.

The storage method can execute high-speed search by storing data in a tabular table while preserving the XML structure. Further, since the storage method creates tables based on the schema information, it can store XML data having a free structure without losing the extensibility of XML. However, since a dedicated device or program is necessary for use in the search, its high versatility is sacrificed. Further, the storage method does not provide partial updating of the data.

SUMMARY OF THE INVENTION

It is an object of the present invention to provide a storage device and a method for structured data that allow searching and updating of the structured data while preserving the high versatility and extensibility thereof. Further, it is another object of the present invention to provide a storage device, a program, and a method for structured data that permit access to the structured data for viewing and editing.

In order to achieve the above object, the present invention provides the following structured data storage devices (1) to (3) and structured data storage methods (4) to (6).

(1) A structured data storage device configured to allow viewing or updating, from an external device, of structured data file stored in a storage medium built in the structured data storage device, comprising:

a storage unit configured to store, into the storage medium, the structured data file having structured data, and an index file having index information for use to search the structured data;

a detecting unit configured to detect whether or not the stored structured data file has been updated by the external device; and an index information generating unit configured to analyze, when the detecting unit detects that the stored structured data file has been updated, the updated structured data file, generate new index information relating to the structured data included in the updated structured data file, and update the stored index file using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which uniquely discriminates the reference element, information which identifies a structured data file having the structured data comprising the discriminated reference element, information which identifies the position of the discriminated reference element in the structured data included in the identified structured data file, information which identifies respective search elements positioned below the discriminated reference element, and content information of the identified search element, the second index component links together information which identifies respective search elements, content information of the identified search element, and information which uniquely discriminates a reference element having the identified search element below itself, the index information generating unit detects a reference element included in the structured data in the updated structured data file, analyzes the updated structured data file by detecting a search element positioned below the detected reference element, and generates the new index information comprising a new first index component and a new second index component, the index information generating unit links together, as the new first index component, information which uniquely discriminates the detected reference element, information which identifies the updated structured data file having the structured data comprising the discriminated reference element, information which identifies the position of the discriminated reference element in the structured data included in the identified structured data file, information which identifies the detected search element positioned below the discriminated reference element, and content information of the detected search element, and the index information generating unit links together, as the new second index component, information which identifies the detected search element, content information of the identified search element, and information which uniquely discriminates the detected reference element having the identified search element below itself.

(2) A structured data storage device comprising:

a storage unit configured to store a structured data file having structured data into a first storage medium to be removably attached to the structured data storage device, and store an index file having index information for use to search the structured data into a second storage medium built in the structured data storage device;

a detecting unit configured to detect whether or not the structured data file stored in the first storage medium has been updated by an external device; and an index information generating unit configured to analyze, when the detecting unit detects that the stored structured data file has been updated, the updated structured data file, generate new index information relating to the structured data included in the updated structured data file, and update the index file stored in the second storage medium using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which uniquely discriminates the reference element, information which identifies the structured data file having the structured data comprising the discriminated reference element, information which identifies the position of the discriminated reference element in the structured data included in the identified structured data file, information which identifies respective search elements positioned below the discriminated reference element, and content information of the identified search element, the second index component links together information which identifies respective search elements, content information of the identified search element, and information which uniquely discriminates a reference element having the identified search element below itself, the index information generating unit detects a reference element included in the structured data in the updated structured data file, analyzes the updated structured data file by detecting a search element positioned below the detected reference element, and generates the new index information comprising a new first index component and a new second index component, the index information generating unit links together, as the new first index component, information which uniquely discriminates the detected reference element, information which identifies the updated structured data file having the structured data comprising the discriminated reference element, information which identifies the position of the discriminated reference element in the structured data included in the identified structured data file, information which identifies the detected search element positioned below the discriminated reference element, and content information of the detected search element, and the index information generating unit links together, as the new second index component, information which identifies the detected search element, content information of the identified search element, and information which uniquely discriminates the detected reference element having the identified search element below itself.

(3) A structured data storage device comprising:

a storage unit configured to store a structured data file having structured data into a storage medium to be removably attached to the structured data storage device, and store an index file having index information for use to search the structured data into the storage medium;

a detecting unit configured to detect whether or not the stored structured data file has been updated by an external device; and an index information generating unit configured to analyze, when the detecting unit detects that the stored structured data file has been updated, the updated structured data file, generate new index information relating to the structured data included in the updated structured data file, and update the stored index file using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which uniquely discriminates the reference element, information which identifies the structured data file having the structured data comprising the discriminated reference element, information which identifies the position of the discriminated reference element in the structured data included in the identified structured data file, information which identifies respective search elements positioned below the discriminated reference element, and content information of the identified search element, the second index component links together information which identifies respective search elements, content information of the identified search element, and information which uniquely discriminates a reference element having the identified search element below itself, the index information generating unit detects a reference element included in the structured data in the updated structured data file, analyzes the updated structured data file by detecting a search element positioned below the detected reference element, and generates the new index information comprising a new first index component and a new second index component, the index information generating unit links together, as the new first index component, information which uniquely discriminates the detected reference element, information which identifies the updated structured data file having the structured data comprising the discriminated reference element, information which identifies the position of the discriminated reference element in the structured data included in the identified structured data file, information which identifies the detected search element positioned below the discriminated reference element, and content information of the detected search element, and the index information generating unit links together, as the new second index component, information which identifies the detected search element, content information of the identified search element, and information which uniquely discriminates the detected reference element having the identified search element below itself.

(4) A structured data storage method in a structured data storage device which allows viewing or updating, from an external device, of structured data file stored in a storage medium built in the structured data storage device, comprising the steps of:

storing, into the storage medium, the structured data file having structured data, and an index file having index information for use to search the structured data;

detecting whether or not the stored structured data file has been updated by the external device; and analyzing, when the detection step detects that the stored structured data file has been updated, the updated structured data file, generating new index information relating to the structured data included in the updated structured data file, and updating the stored index file using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which uniquely discriminates the reference element, information which identifies the structured data file having the structured data comprising the discriminated reference element, information which identifies the position of the discriminated reference element in the structured data included in the identified structured data file, information which identifies respective search elements positioned below the discriminated reference element, and content information of the identified search element, the second index component links together information which identifies respective search elements, content information of the identified search element, and information which uniquely discriminates a reference element having the identified search element below itself, the index information generating step detects a reference element included in the structured data included in the updated structured data file, analyzes the updated structured data file by detecting a search element positioned below the detected reference element, and generates the new index information comprising a new first index component and a new second index component, the index information generating step links together, as the new first index component, information which uniquely discriminates the detected reference element, information which identifies the updated structured data file having the structured data comprising the discriminated reference element, information which identifies the position of the discriminated reference element in the structured data included in the identified structured data file, information which identifies the detected search element positioned below the discriminated reference element, and content information of the detected search element, and the index information generating step links together, as the new second index component, information which identifies the detected search element, content information of the identified search element, and information which uniquely discriminates the detected reference element having the identified search element below itself.

(5) A structured data storage method in a structured data storage device which stores structured data file in a storage medium, comprising the steps of:

storing the structured data file having structured data into a first storage medium to be removably attached to the structured data storage device, and storing an index file having index information for use to search the structured data into a second storage medium built in the structured data storage device;

detecting whether or not the structured data file stored in the first storage medium has been updated by an external device; and analyzing, when the detection step detects that the stored structured data file has been updated, the updated structured data file, generating new index information relating to the structured data included in the updated structured data file, and updating the index file stored in the second storage medium using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which uniquely discriminates the reference element, information which identifies the structured data file having the structured data comprising the discriminated reference element, information which identifies the position of the discriminated reference element in the structured data included in the identified structured data file, information which identifies respective search elements positioned below the discriminated reference element, and content information of the identified search element, the second index component links together information which identifies respective search elements, content information of the identified search element, and information which uniquely discriminates a reference element having the identified search element below itself, the index information generating step detects a reference element included in the structured data in the updated structured data file, analyzes the updated structured data file by detecting a search element positioned below the detected reference element, and generates the new index information comprising a new first index component and a new second index component, the index information generating step links together, as the new first index component, information which uniquely discriminates the detected reference element, information which identifies the updated structured data file having the structured data comprising the discriminated reference element, information which identifies the position of the discriminated reference element in the structured data included in the identified structured data file, information which identifies the detected search element positioned below the discriminated reference element, and content information of the detected search element, and the index information generating step links together, as the new second index component, information which identifies the detected search element, content information of the identified search element, and information which uniquely discriminates the detected reference element having the identified search element below itself.

(6) A structured data storage method in a structured data storage device which stores structured data file in a storage medium, comprising the steps of:

storing the structured data file having structured data into a storage medium to be removably attached to the structured data storage device, and storing an index file having index information for use to search the structured data into the storage medium;

detecting whether or not the stored structured data file has been updated by an external device; and analyzing, when the detection step detects that the stored structured data file has been updated, the updated structured data file, generating new index information relating to the structured data included in the updated structured data file, and updating the stored index file using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which uniquely discriminates the reference element, information which identifies the structured data file having the structured data comprising the discriminated reference element, information which identifies the position of the discriminated reference element in the structured data included in the identified structured data file, information which identifies respective search elements positioned below the discriminated reference element, and content information of the identified search element, the second index component links together information which identifies respective search elements, content information of the identified search element, and information which uniquely discriminates a reference element having the identified search element below itself, the index information generating step detects a reference element included in the structured data in the updated structured data file, analyzes the updated structured data file by detecting a search element positioned below the detected reference element, and generates the new index information comprising a new first index component and a new second index component, the index information generating step links together, as the new first index component, information which uniquely discriminates the detected reference element, information which identifies the updated structured data file having the structured data comprising the discriminated reference element, information which identifies the position of the discriminated reference element in the structured data included in the identified structured data file, information which identifies the detected search element positioned below the discriminated reference element, and content information of the detected search element, and the index information generating step links together, as the new second index component, information which identifies the detected search element, content information of the identified search element, and information which uniquely discriminates the detected reference element having the identified search element below itself.

According to the present invention, it is possible to obtain the effect that the storage device and the storage method allow searching and updating of the structured data while preserving the high versatility and extensibility thereof, by storing the structured data comprising the above structures (e.g. storing it as a text file) and generating the index information comprising the above structures relating to the structured data and storing the index information (e.g. storing it as a binary file).

BRIEF DESCRIPTION OF THE DRAWINGS

FIG. 15 is an example of XML data according to the embodiment of the present invention.

FIG. 21 is a screen displaying a list of motion pictures according to the embodiment of the present invention.

DESCRIPTION OF THE PREFERRED EMBODIMENTS

Figure 1:
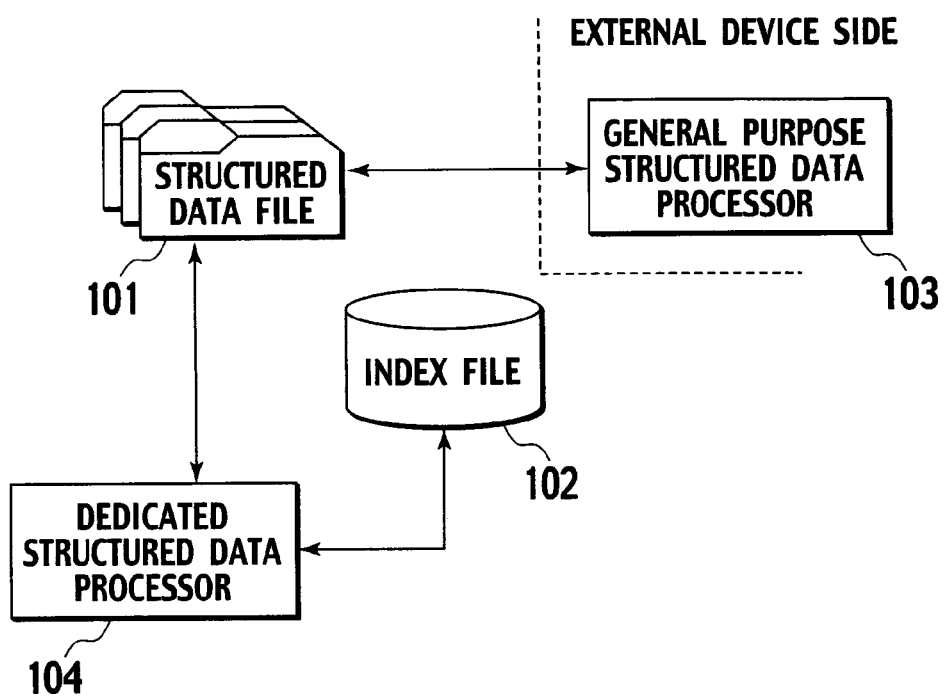
FIG. 1 is conceptual view of a structured data storage device according to an embodiment of the present invention.

FIG. 1 is a simplified view illustrating the concept of the structured data storage device of the present invention. As shown in FIG. 1, the structured data storage device comprises a structured data file 101, an index file 102, and a dedicated structured data processor 104.

The structured data storage device stores structured data into the structured data file 101 including one or more text files, and stores, into the index file 102 which is a binary file, index information generated for increasing the speed of searching or updating the structured data.

A general-purpose, structured data processor 103 on the external device side, comprising a general-purpose parser for structured data, a general-purpose editor for general-purpose structured data, a text editor or the like, has a functionality of viewing and updating the content of the structured data file.

The dedicated structured data processor 104 has a functionality of analyzing the structured data file 101 and generating index information relating to the structured data (when the structured data processor 104 generates the structured data, it generates index information relating to the structured data simultaneously with generation of the structured data, or analyzes the structured data and generates the index information just after generation of the structured data), a functionality of storing the index information into the index file 102, and a functionality of searching and updating the structured data using the structured data file 101 and the index file 102.

Further, the dedicated structured data processor 104 has a functionality of detecting that the content of structured data file 101 has been updated, analyzing the updated structured data file 101 to generate new index information relating to the structured data included in the structured data file, and updating the index file 102 using the new index information, when the structured data file 101 has been updated by the general-purpose structured data processor 103 on the external device side.

Embodiment

Next, an embodiment applying the structured data storage device of the present invention will be described.

(Arrangement of the Embodiment)

Figure 2:
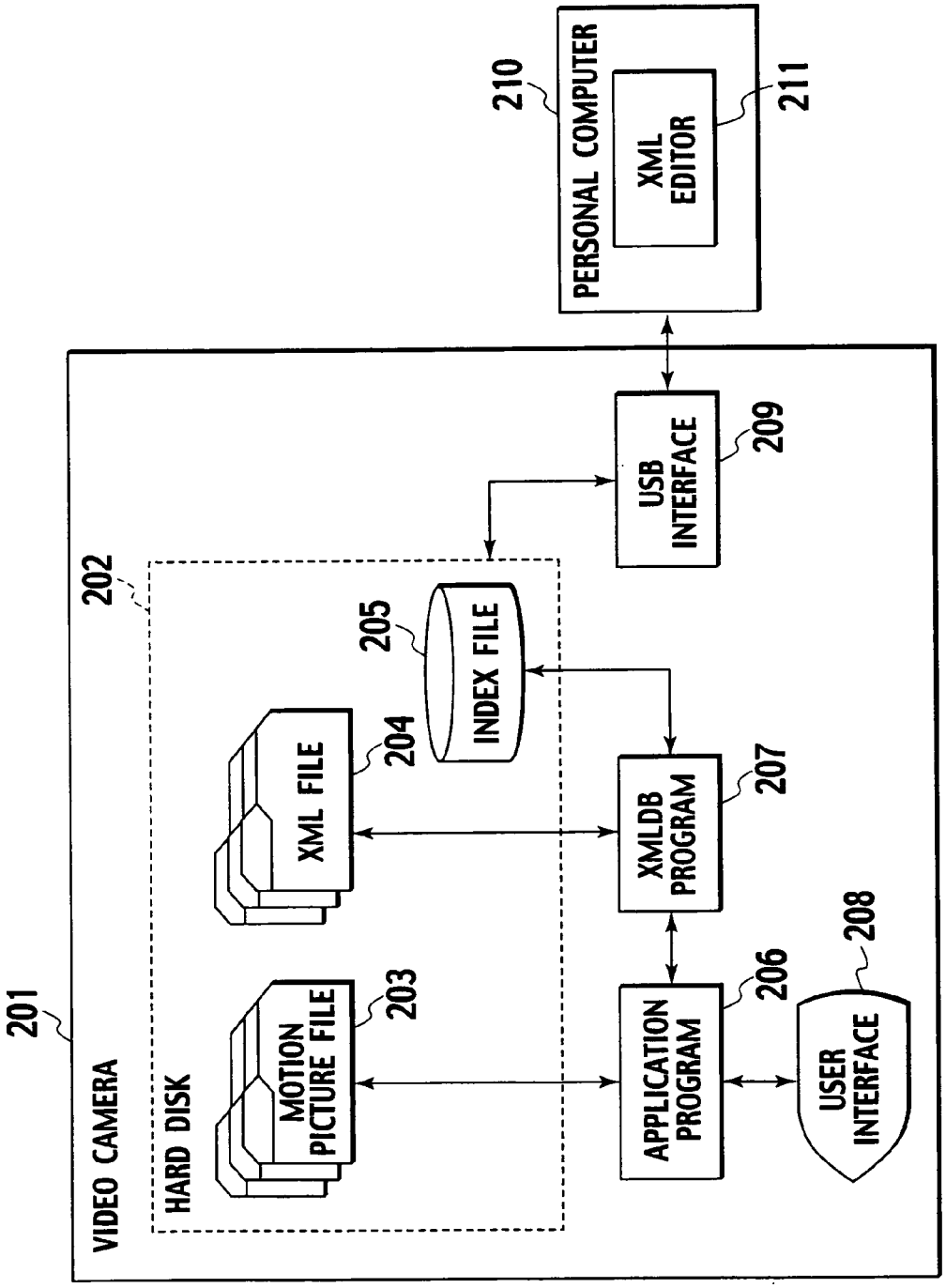
FIG. 2 is a block diagram of the structured data storage device according to the embodiment of the present invention.

FIG. 2 is a block diagram illustrating the embodiment of the structured data storage device. The embodiment is one applied to a video camera for use in metadata management.

A video camera 201 having a built-in hard-disk 202 which is a fixed-type, intra-device storage medium, is provided with functionalities of an ordinary video camera such as recording and playing motion pictures. The video camera 201 comprises devices that are required as a video camera such as the hard-disk 202, an application program 206, an XML DB program 207, a user interface 208, a USB interface 209, a lens, and a microphone. The video camera 201 has a functionality of connecting to a personal computer 210 which is an external device via the USB interface 209.

The hard-disk 202 is a storage device for recording motion picture data and other management information. The hard-disk 202 comprises a movie file 203, an XML file 204, and an index file 205.

Motion picture data captured by the video camera 201 is recorded into the hard-disk 202 as a motion picture file 203. MPEG-2, for example, is used as the format of the motion picture file 203.

Metadata, a structured data relating to the motion picture data, is recorded into the hard-disk 202 as the XML (eXtensible Markup Language) file 204, which is a text file. The meta data is structured XML data, having a title, captured date and time, and genre, for example, as its content.

In order to execute processes such as searching and updating of the XML data at high speed, index information which is a binary file is recorded into the hard-disk 202 as the index file 205. The index file 205 is stored into a region in the hard-disk 202 which cannot be updated by the personal computer 210. Although it may be arranged such that the index file 205 is stored in a region in the hard-disk 202 which can be updated by the personal computer 210, in this case, it is recommended to state a warning, in the instruction manual of commercial products implementing the present embodiment, not to update the index file 205 from the personal computer side.

The application program 206 is one that operates on the video camera 201 and has a functionality of controlling the entire operation of the video camera 201. The application program 206 has, as well as controlling the ordinary operation as a video camera such as recording and playing motion pictures, a functionality of outputting XML data for newly creating an XML file to the XML DB program 207, a functionality of outputting, to the XML DB program 207, metadata relating to the motion pictures generated by the application program 206 or input from the user interface 208, a functionality of instructing the XML DB program 207 to execute searching using the search option which is input from the user interface 208, and a functionality of outputting, to the user interface, metadata relating to the motion pictures input with the XML DB program 207.

The XML DB program 207, which is a program operating as a database based on XML, manages metadata relating to motion pictures. The XML DB program 207 has a functionality of newly creating the XML file 204, a functionality of analyzing the XML file 204 to generate and store index information relating to the XML data into the index file 205, and a functionality of searching, updating and adding the XML data stored in the XML file 204 and the index file 205 by instructions from the application program 206.

The user interface 208 comprises an LCD monitor, a plurality of keys, and the like. The user interface 208 has a functionality of presenting the motion picture data, metadata or the like to the user, a functionality of receiving instructions from the user such as start or stop of image capturing, and a functionality of receiving instructions from the user such as display or search of metadata.

The USB interface 209 is a terminal for connecting to the personal computer 210 via a USB cable. The USB interface 209 provides a functionality of reading and writing the files recorded in the hard-disk 202 by the personal computer 210, when the video camera 201 is connected to the personal computer 210 via the USB interface 209.

The personal computer 210 is an ordinary personal computer having a USB terminal. When connected to the video camera 201 via the USB cable, the personal computer 210 can read and write the files recorded in the hard-disk 202 which is built in the video camera 201.

The XML editor 211 is a general-purpose program for reading and writing XML files. When the personal computer 210 and video camera 202 are connected by the USB cable, the user can read and write the XML file 204 recorded in the hard-disk 202 using the XML editor 211. Here, in place of the XML editor 211, it may be arranged such that a general-purpose text editor or a dedicated program for reading and writing metadata relating to the motion picture data of the video camera is used.

The arrangement of the present embodiment has been described above. However, it may be arranged such that, instead of recording the XML file 204 into the hard-disk 202 and connecting to the personal computer 210 by the USB interface 209, the XML file may be recorded into a storage medium such as an SD memory which is removably attached to the video camera, and thereby enabling reading and writing the XML file through the personal computer by attaching the storage medium removed from the video camera to a read/write device provided to the personal computer. Additionally, the index file 205, as well as the XML file 204, may also be recorded into a removable storage medium such as an SD memory. In this case, it is recommended to state a warning, in the instruction manual of commercial products implementing the present embodiment, not to update the index file 205 by the personal computer.

(Explanation of XML Terminology)

Now, terminology of XML which is used for the XML data being the structured data of the present embodiment will be briefly described.

In XML, data is structured using tags that start with a "<" and end with a ">". There are a start tag, an end tag, and an empty tag as types of tags. A data unit enclosed by the start tag and end tag, and a data unit expressed by the empty tag are referred to as elements. The start tag and empty tag can have an attribute described inside thereof. Further, a unit of text data existing outside the tag is referred to as a text node. Also, a data unit expressed by a tag starting with "<!--" and ending with "-->" is referred to as a comment.

Elements, attributes, text nodes, and comments composing XML are generally referred to as nodes. Although there are other types of nodes for XML than those described above, further description is omitted since they are unnecessary for explaining the present invention.

A node existing inside the start/end tag composing an element is referred to as the descendant node of the element. Here, attribute is not included in the descendant node. Particularly, a node existing right under the element is referred to as a child node of the element. Reversely, the element to which the child node belongs is referred to as the parent element. Further, nodes having the same parent node are referred to as sibling nodes.

(Arrangement of the Index File)

Next, the arrangement of the index file 205 will be described.

Figures 3, 4:
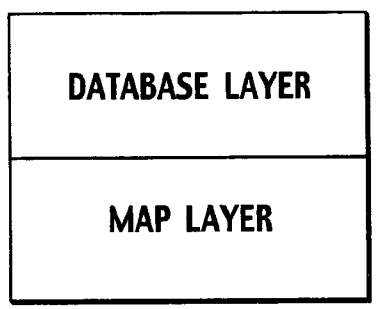
FIG. 3 is a block diagram of an index file according to the embodiment of the present invention.
FIG. 4 is a view depicting the format of the position path in a functional format according to the embodiment of the present invention.

FIG. 3 is a conceptual block diagram of the index file of the present embodiment. Conceptually, the index file is composed of a map layer located at a lower position and a database layer located at a higher position.

The map layer associates a key with a value as a pair. The key and value are character string data. The structure of the map layer must be capable of executing processes such as searching a value associated with a key, updating the value associated with a key, deleting a pair of a key and the value associated therewith, and sequentially obtaining values in ascending or descending order of keys. Further, it must also be capable of grouping the pairs of keys and values according to the map names, in other words, execution of various processes such as searching only the pairs of keys and values which belong to the map by specifying the map name. As a specific implementation method, a B-Tree (Balanced Tree) is used. Alternatively, a relational database may be used.

The database layer composes index information relating to XML data, using the functionality of the map layer. The database layer comprises an XML document ID map, an XML document information map, an index information map, a base element value map, and a search index map. A specific example is shown in FIGS. 16 to 19, which will be described below.

The XML document ID map is a map having the file path of the XML document as its key and the XML document ID which uniquely discriminates the XML document as its value.

The XML document information map is a map having the XML document ID as its key and the XML document information as its value. The XML document information includes the file path, the file size, and the last updated date and time of the file.

The index information map is a map having the X path which identifies the element of an XML document as its key and the index information as its value. Hereinafter, the element specified by the X path as its key will be referred to as a base element (reference element). The index information includes a relative path from the base element identifying, among descendant nodes of the base element, the node used for searching (hereinafter referred to as the search node (search element)). There may be a plurality of types of X paths for identifying the base element. In addition, the relative path identifying the search node may be specified for each of the X paths identifying the base element, and a plurality of types of relative paths may be included for a single type of base element. It is assumed that the relative path will be discriminated by a nonnegative integer ID starting from zero in a specified order for each of the corresponding base elements.

The base element value map (first index component) is a map having the node ID which uniquely discriminates a base element (information which uniquely discriminates the reference element) as its key and the base element value as its value. The base element value includes an XML document ID (information which identifies the structured data file having structured data comprising the reference element which has been uniquely discriminated) of the XML document including the base element, a position path identifying the position of the base element within the XML document (information which identifies the position of the reference element in the structured data included in the identified structured data file), and the node value of the search node existing in the descendants (information which identifies respective search elements positioned below the reference element, and content information of respective search elements). Here, the node value of search node is included in the base element value together with the ID which discriminates the relative path of the corresponding search node (information which identifies the search element).

The search index map (second index component) is a map having the node value of the search node (content information of the search element) as its key and having, as its value, the node ID of the base element having the search node as its descendant (information which uniquely discriminates the reference element comprising the search element having its content information). The search index map is prepared for each relative path (one for each piece of information identifying the search element) identifying the search nodes included in the index information of the index information map.

(Explanation of Position Path)

Next, the position path included in the above-mentioned base element value will be described.

The position path is information for identifying a node within a XML document. Although the X path is provided with a similar functionality, the position path is directed to processing at a high-speed with less information than the X path. While the X path can specify a plurality of nodes simultaneously, the position path always identifies a single node.

FIG. 4 is a view depicting the format of the position path of the present embodiment in a functional format.

The position path first starts from the NumOfPositions field. The NumOfPositions field is a 32-bit nonnegative integer and specifies the number of subsequent Position fields.

Next, Position fields follow in numbers specified in the NumOfPositions field. The position field is a 16-bit positive number and specifies one of the child nodes of a certain element by a value indicating its order among the child nodes of the parent element.

If the NumOfPositions field is zero, the node identified by the position path is a root element.

If the numOfPositions field is equal to or larger than one, one of the child nodes of the root element is specified in the first Position field (Position [0]). If the further specified child node is an element, one of its child nodes is specified in the next Position field (Position [1]). Then, likewise, nodes as many as the number of Position fields are traced, and the node specified in the last Position field (Position [NumOfPositions-1]) is the node identified by the position path. Here, the nodes specified in the Position field other than the last Position field must be an element.

Although an attribute cannot be identified by the position path format of the present embodiment, it is not particularly problematic, since the position path of the present embodiment is only used for identifying the base element.

(Flow of XML File Analysis Decision Process)

Next, the flow of XML file analysis decision process executed by the XML DB program of the present embodiment will be described.

Here, the XML file analysis decision process is executed by the XML DB program in an occasion where the XML file may have been updated, such as after the XML DB program newly created an XML file by input of XML data from the application program, after the connection between the video camera and the personal computer via the USB interface was disconnected, or, in an arrangement using a removable storage medium such as an SD memory, after the storage medium was attached to the video camera. The XML file analysis decision process is executed when an application program passes, as an input parameter, a file path of the XML file to be analyzed to the XML DB.

Figure 5:
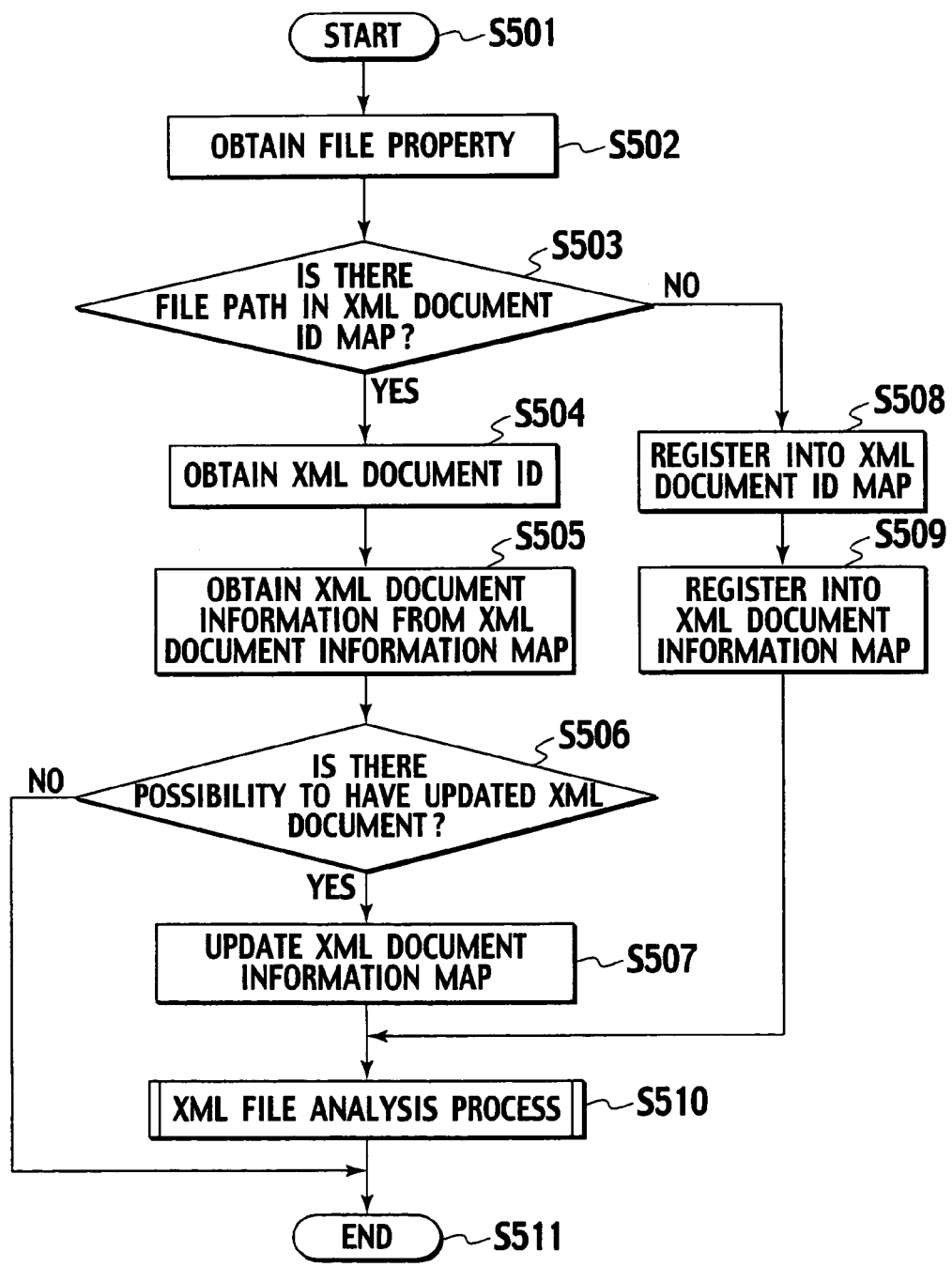
FIG. 5 is a flow chart of an XML file analysis decision process executed by an XML DB program according to the embodiment of the present invention.

FIG. 5 is a flow chart illustrating the flow of XML file analysis decision process executed by the XML DB program.

The XML file analysis decision process is started (S501).

First, the file attribute of the XML file to be analyzed is obtained (S502). The file attribute obtained here is the file size and the last updated date and time.

Next, it is determined whether or not there exists a key which is registered in the XML document ID map and conforms to the file path of the XML file to be analyzed (S503). If there exists a key conforming to the file path of the XML file to be analyzed, the flow proceeds to step S504, otherwise the flow proceeds to step S508.

In step S504, an XML document ID for the XML file to be analyzed is obtained. In other words, a value corresponding to the file path, which is the key of the XML file to be analyzed, is obtained from the XML document ID map.

Next, XML document information is obtained from the XML document information map (S505). In other words, a value corresponding to the XML document ID which is the key obtained in step S504, is obtained from XML document information map. As stated above, the file size and the last updated date and time are included in the XML document information.

Next, it is determined whether or not there is a possibility to have updated the XML document (S506). Specifically, it is determined that there is no possibility to have updated the XML document only if the file size and the last updated date and time included in the file attribute obtained in step S502 completely conform to the file size and the last updated date and time included in the XML document information obtained in step S505, otherwise it is determined that there is a possibility to have updated the XML document.

If there is a possibility to have updated the XML document, the XML document information map is updated (S507). Specifically, the file size and the last updated date and time of the XML document information corresponding to the XML document ID obtained in step S504 are updated by the file size and the last updated date and time included in the file attribute obtained in step S502. Then, the flow proceeds to S510.

If there is no possibility to have updated the XML document, the flow proceeds to END step S511.

In step S508, an XML document ID for the XML file to be analyzed is registered into the XML document ID map. Specifically, an ID which does not overlap with existing XML document IDs is generated, and then an entry having the file path of the XML file to be analyzed as its key and the generated XML document ID as its value is added to the XML document ID map. Here, the XML document ID is a positive number and may be selected by adding one to the maximum value of an existing ID. Alternatively, a counter with an initial value of one may be separately provided for the XML document ID and a process may be executed such that the counter may be incremented by one after the counter value has been obtained as the XML document ID.

Next, the XML document information for the XML file to be analyzed is registered into the XML document information map (S509). Specifically, the XML document information is generated according to the file path of the XML file to be analyzed and the file size and the last updated date and time obtained in step S502, and then an entry having the XML document ID generated in step S508 as its key and the XML document information generated here as its value is added to the XML document information map. Subsequently, the flow proceeds to Step S510.

Step S510 executes the XML file analysis process. In this occasion, the file path of the XML file to be analyzed and the XML document ID obtained in step S504 or step S508 are passed as input parameters.

The XML file analysis decision process is finished (S511).

(Flow of XML File Analysis Process)

Next, the flow of the XML file analysis process in step S510 of the XML file analysis process will be described.

Figure 6:
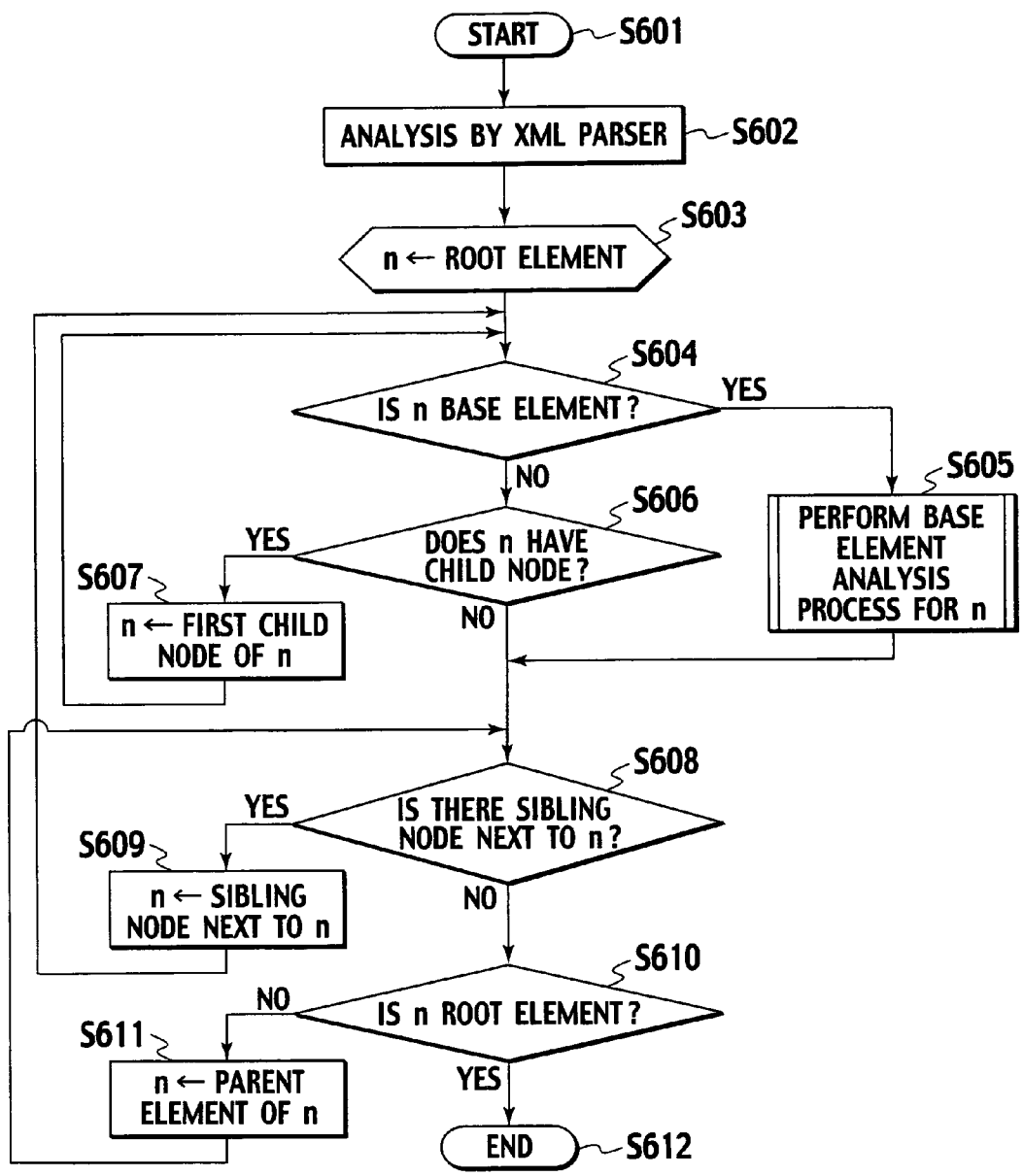
FIG. 6 is a flow chart of an XML file analysis process executed by the XML DB program according to the embodiment of the present invention.

FIG. 6 is a flow chart illustrating the flow of XML file analysis process executed by the XML DB program.

The XML file analysis process is started (S601).

The XML file identified by a file path passed as an input parameter is analyzed by the XML parser (S602). The XML parser, which is one of the components of the XML DB program, has a general functionality as a XML parser such as reading data from the XML file and decomposing the read XML data into nodes.

Next, a variable n is assigned as the root element with regard to the XML data analyzed by the XML parser, (S603).

Next, it is determined whether or not the node indicated by variable n is a base element (S604). The determination uses the X path identifying a predefined base element as an initial setting of the XML DB program. If the node indicated by the variable n conforms to the X path, it is determined that the node indicated by the variable n is the base element.

If the node indicated by the variable n is the base element, the base element analysis process is executed for the node indicated by the variable n (S605). In this occasion, the file path and the XML document ID which are the input parameters of the XML file analysis process, and the X path in which the node indicated by the variable n that conformed to in step S604, i.e., the X path indicating the base element, are passed as input parameters. Subsequently, the flow proceeds to determination step S606 where it is determined whether or not there are any sibling nodes next to the node indicated by the variable n.

If the node indicated by the variable n is not the base element, it is determined whether or not the node indicated by the variable n has a child node (S606).

If the node indicated by the variable n has a child node, the flow proceeds to determination step S604 where it is determined whether or not the node indicated by the variable n is the base element, with the variable n turned into the first child node of the variable n (S607).

If the node indicated by the variable n does not have a child node, it is determined whether or not there exists a node having the same parent element as with the node indicated by the variable n, that is, a node positioned next to the node indicated by the variable n among sibling nodes of the node indicated by the variable n (S608). In other words, it is determined whether or not the node indicated by the variable n is the last node among the child nodes of its parent element.

If there exists a next sibling node of the node indicated by the variable n, the flow proceeds to determination step S604 where it is determined whether or not the node indicated by the variable n is the base element, with variable n turned into the next sibling node of the variable n (S609).

If there does not exist any next sibling node of the node indicated by the variable n, it is determined whether or not the node indicated by the variable n is the root element (S610).

If the node indicated by the variable n is not the root element, the flow proceeds to determination step S608 where it is determined whether or not there exists a sibling node next to the node indicated by variable n, with variable n turned into the parent element of variable n (S611).

If the node indicated by the variable n is the root element, the XML file analysis process is finished (S612).

(Flow of the Base Element Analysis Process)

Next, the flow of the base element analysis process step S606 will be described in detail.

Figure 7:
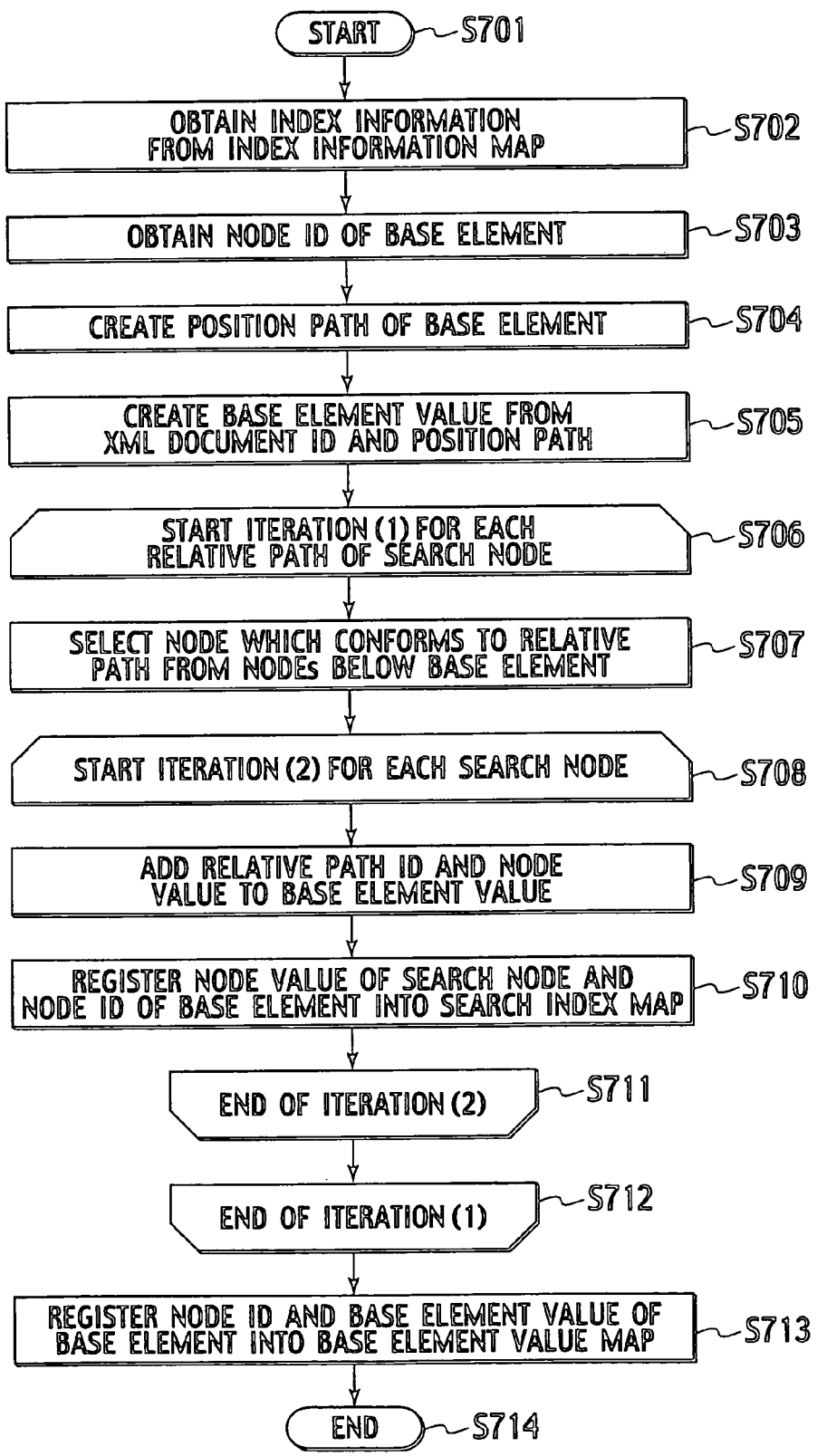
FIG. 7 is a flow chart of a base element analysis process executed by the XML DB program according to the embodiment of the present invention.

FIG. 7 is a flow chart illustrating the base element analysis process executed by the XML DB program.

The base element analysis process is started (S701).

First, index information corresponding to the base element to be processed is obtained from the index information map (S702). Specifically, a value having the X path identifying the base element of the input parameter as its key, i.e., the index information, is obtained from the index information map.

Next, a node ID of the base element is obtained (S703). The node ID is a positive number, and an ID not overlapping with existing IDs is selected. More specifically, the maximum value of existing IDs may be incremented by one, for example. Alternatively, a counter with an initial value of one may be separately provided for the node ID and a process may be executed such that the counter may be incremented by one after the counter value has been obtained as the node ID.

Next, a position path of the base element is created (S704). Next, a base node value is created from the node ID obtained in step S703 and the position path created in step S704 (S705). Here, the node value of the search node is kept null.

Next, a process which is started at step S706 and finished at step S712 is repeated for each of the relative paths identifying the search node in the X path which identifies the base element of an input parameter. In this occasion, the relative path identifying the search node is included in the index information obtained in step S702. This process is referred to as iteration (1).

Iteration (1) first selects a node conforming to the relative path among the nodes below the base element in the relative path identifying the search node to be processed (S707). Here, nodes below the base element are descendant nodes of the base element, and attribute of the base element and their descendant nodes.

Next, a process which is started at step S708 and finished at step S711 is repeated for each of the nodes selected in step S707. This process is referred to as iteration (2).

Iteration (2) first adds the ID which discriminates the relative path identifying the search node to be processed in iteration (1), and the node value of the node to be processed in iteration (2) to the base element value (S709).

Next, the node value of the node to be processed and the node ID of the base element obtained in step S703 are registered into the search index map (S710). Specifically, an entry having the node value of the node to be processed as its key and the node ID of the base element as its value is added to the search index map for the relative path identifying the search node to be processed in iteration (1).

Iteration (2) is finished (S711).

Iteration (1) is finished (S712).

Next, the node ID of the base element obtained in step S703, and the base element value created in step S705 and updated in step S709 are registered into the base element value map (S713). Specifically, an entry having the node ID of the base element as its key and the base element value as its value is added to the base element value map.

The base element analysis process is finished (S714).

(Flow of the Search Process)

Next, the flow of the search process executed by the XML DB program of the present embodiment will be described.

The search process is executed by the XML DB program according to an instruction from the application program. An X path identifying the base element, a relative path from the base element identifying a node of the search result, a relative path from the base element identifying a search node, and a search key are passed as input parameters. A list of nodes is returned from the XML DB program to the application program as the search result.

Figure 8:
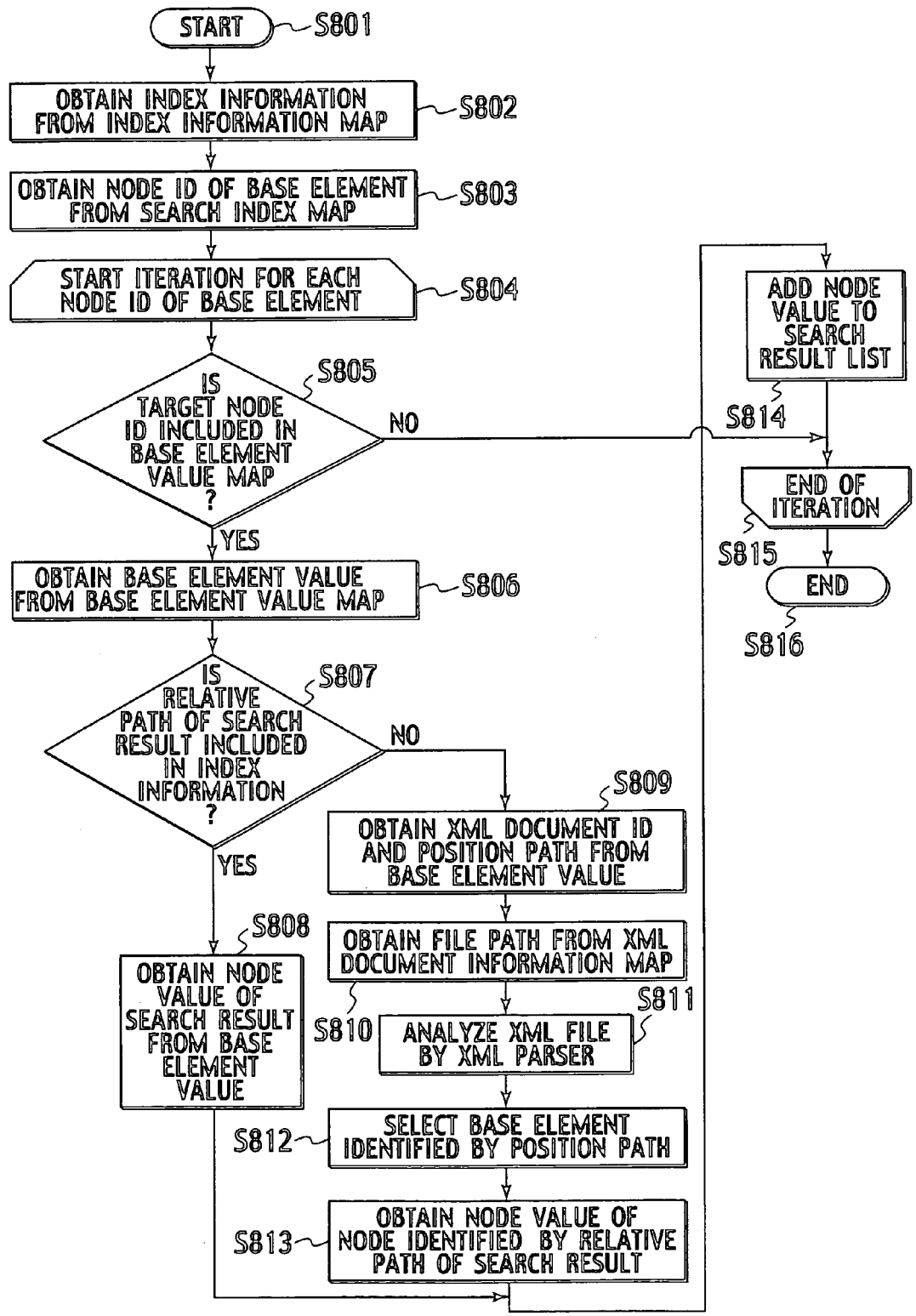
FIG. 8 is a flow chart of search process by the XML DB program according to the embodiment of the present invention.

FIG. 8 is a flow chart illustrating the search process executed by the XML DB program.

The search process is started (S801).

First, index information corresponding to the X path identifying the base element of the input parameters is obtained from the index information map (S802). Specifically, a value having the X path identifying the base element of the input parameters as the key, i.e., the index information, is obtained from the index information map.

Next, a value having the search key of the input parameters as the key, i.e., the node ID of the base element is obtained from the search index map for the relative path identifying the search node of the input parameters in the X path identifying the base element of the input parameters (S803). There may be zero or more than one node IDs obtained.

Next, a process which is started at step S804 and finished at step S812 is repeated for each of the node IDs obtained in step S803. If there is no node ID obtained in S803, the flow proceeds to step S814 without executing the iteration process.

The iteration process first determines whether or not there exists, in the base element value map, a key of the node ID which is identical to the node ID to be processed (S805). If there is any, the flow proceeds to step S806. If there is none, the flow proceeds to step S815, that is, the flow proceeds to the next iteration process, or, in the case of the last iteration process the iteration is finished.

In step S806, a value having the node ID of the node to be processed as its key, i.e., the base element value is obtained from base element value map.

Next, it is determined whether or not the relative path identifying a node of the search result of the input parameters is included in the index information obtained in step S802 (S807). The flow proceeds to step S808 if it is included, otherwise the flow proceeds to step S809.

In step S808, a node value of the node identified in the relative path identifying the node of the search result of the input parameters is obtained from the base element value obtained in step S806. Specifically, the ID of the relative path is identified by the order of inclusion, in the index information obtained in step S802, of the relative path identifying the node of the search result, and the node value included in the base element value together with its relative path ID is obtained. There may be zero or more than one node values obtained. Subsequently, the flow proceeds to S814.

In step S809, an XML document ID and a position path included in the base element value obtained in step S806 are obtained.

Next, a file path of the XML file is obtained from the XML document information map (S810). Specifically, a value having the XML document ID obtained in step S809 as its key, i.e., the file path, is obtained from the XML document information map.

Next, an XML file identified by the file path obtained in step S810 is analyzed by the XML parser (S811).

Next, a base element identified by the position path obtained in step S809 is selected from the XML data analyzed in step S811 (S812). Here, always one element is selected.

Next, a node value of the node identified by the relative path identifying the node of the search result of the input parameters is obtained (S813), for the base element selected in step S812. There may be zero or more than one node values obtained. Subsequently, the flow proceeds to S814.

In step S814, the node value obtained in step S808 or step S813 is added to the search result list. Here, nothing will be done if no node value has been obtained.

The iteration process is finished (S815).

The search process is finished (S816). A list of search result is returned from the XML DB program to the application program.

(Flow of the Deletion Process)

Next, the flow of the deletion process executed by the XML DB program of the present embodiment will be described.

The deletion process is executed by the XML DB program according to an instruction from the application program. An X path identifying the base element, a relative path from the base element identifying the node to be deleted, a relative path from the base element identifying the search node, and a search key are passed as input parameters.

Figure 9:
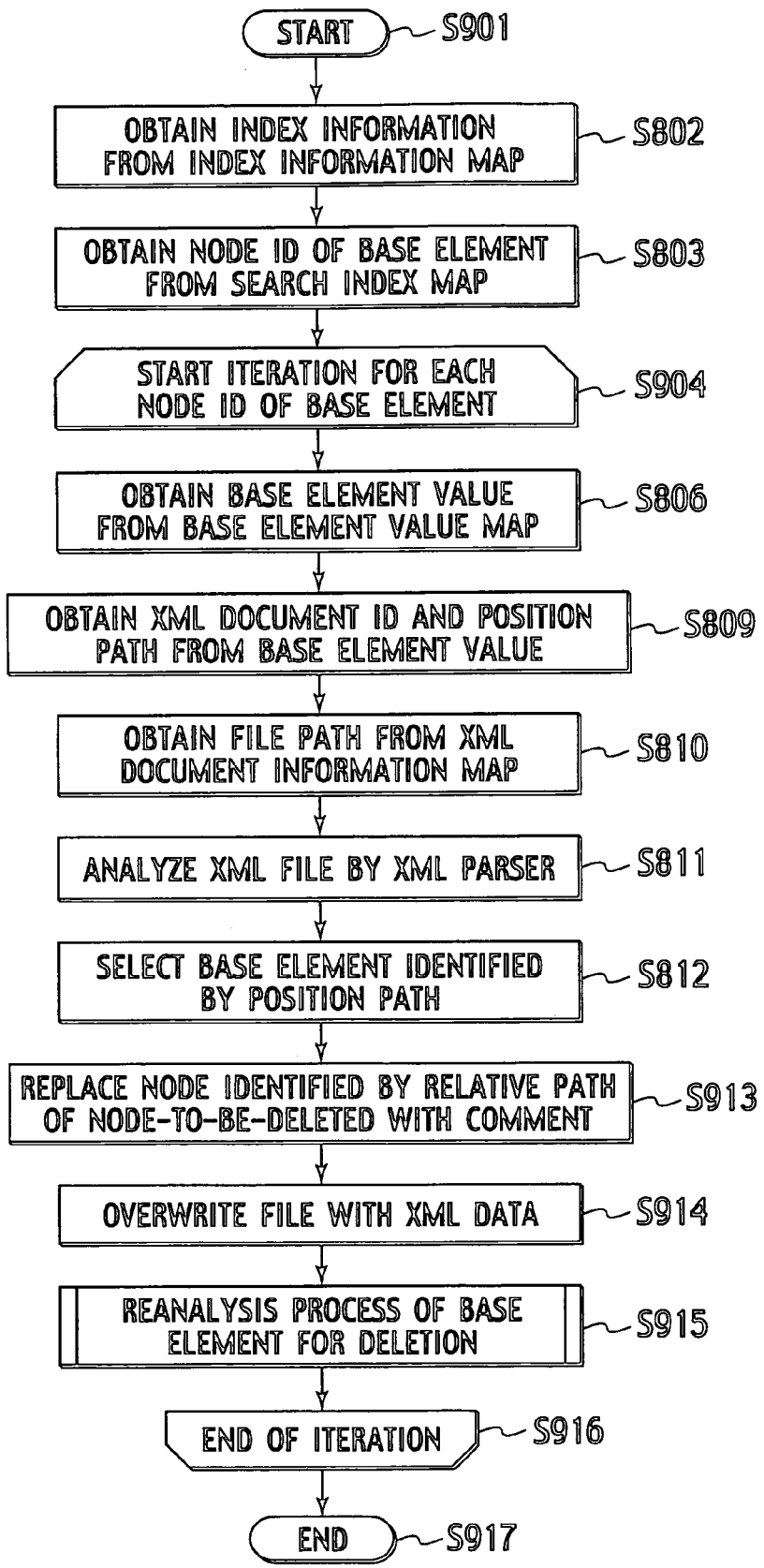
FIG. 9 is a flow chart of a deletion process executed by the XML DB program according to the embodiment of the present invention.

FIG. 9 is a flow chart illustrating the deletion process executed by the XML DB program.

The deletion process is started (S901). The subsequent processes of steps S802 and S803 are identical to steps S802 and S803 in the flow chart illustrating the search process executed by the XML DB program of FIG. 8.

Next, a process which is started at step S904 and finished at step S916 is repeated for each of the node IDs of the base element obtained in step S803.

The processes of step S806 and steps S809 to S812 are identical to step S806 and steps S809 to S812 in the flow chart illustrating the search process executed by the XML DB program of FIG. 8.

Next, among the nodes below the base element selected in step S812, the node identified by the relative path of the node to be deleted is substituted by a comment (S913). Here, the base element itself may be substituted.

Next, the file which has been read in step S811 is overwritten by the XML data updated in step S913 (S914).

Next, the re-analysis process of the base element to be deleted is executed (S915). Here, whether or not the base element itself has been deleted (substituted, to be precise) in step S913, a node ID of the base element to be processed in the iteration process, index information obtained in step S802, a base element value obtained in step S806, an XML document ID obtained in step S809, and the base element obtained in step S812 are passed as input parameters.

The iteration process is finished (S916).

The deletion process is finished (S917).

(Flow of the Re-Analysis Process of the Base Element to be Deleted)

Next, the flow of the re-analysis process of the base element to be deleted of step S915 will be described.

Figure 10:
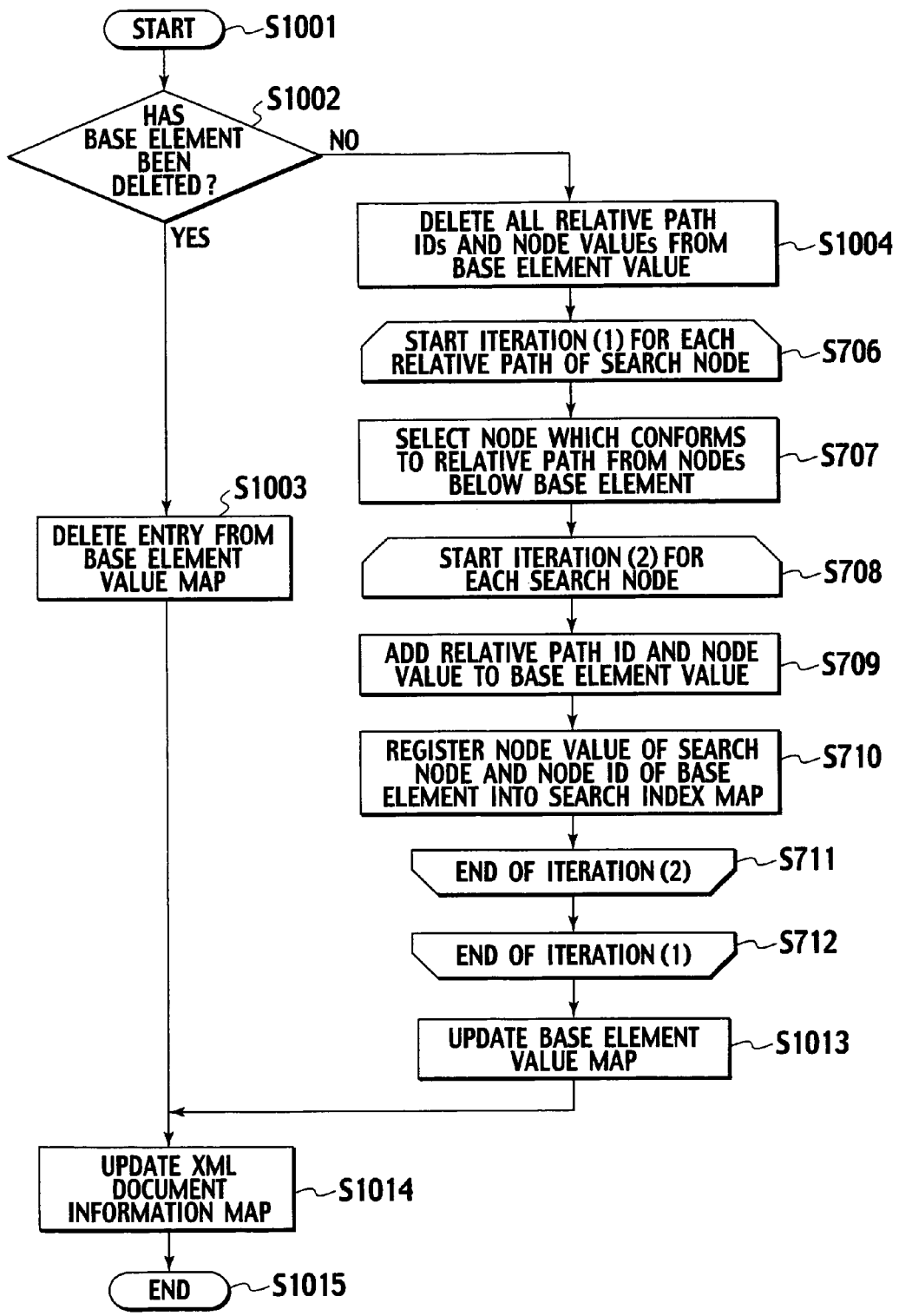
FIG. 10 is a flow chart of a base element re-analysis process for deletion by the XML DB program according to the embodiment of the present invention.

FIG. 10 is a flow chart illustrating the re-analysis process of the base element to be deleted by the XML DB program.

The base element re-analysis process is started (S1001).

First, it is determined in the deletion process whether or not the base element itself has been deleted (S1002). Whether or not the base element itself has been deleted can be determined by the input parameters. If the base element itself has been deleted the flow proceeds to step S1003, otherwise the flow proceeds to step S1004.

In step S1003, an entry having the node ID of the base element of the input parameters as its key is deleted from the base element value map. Subsequently, the flow proceeds to step S1014.

In step S1004, all of the relative path IDs and the node values are deleted from the base element value of the input parameters.

Steps S706 to S712 are identical to steps S706 to S712 in the flow chart illustrating the base element analysis process of FIG. 7. However, the index information, the base element, the node ID of the base element, and the base element value are those taken from the input parameters.

Next, the base element value map is updated (S1013). Specifically, a value having, as its key, the node ID of the base element of the input parameters in the base element value map is updated by a base element value which has been input as an input parameter and updated in the processes from steps S1004 to S712. Subsequently, the flow proceeds to step S1014.

In step S1014, the XML document information map is updated. Specifically, a value having the XML document ID as its key, i.e., the XML document information is obtained from the XML document information map, the file size and the last updated date and time of the file indicated by the file path included in the obtained XML document information are obtained, the XML document information is updated according to the obtained file size and last updated date and time, and the value having the XML document ID of the XML document information map as its key is updated according to the updated XML document information.

The re-analysis process of the base element to be deleted is finished (S1015).

(Flow of Updating Process)

Next, the flow of the update process executed by the XML DB program of the present embodiment will be described.

The update process is executed by the XML DB program according to an instruction from the application program. An X path identifying the base element, a relative path from the base element identifying the node to be updated, a new node used for the updating (referred to as the update node hereinafter), a relative path from the base element identifying the search node, and a search key are passed as input parameters.

Figure 11:
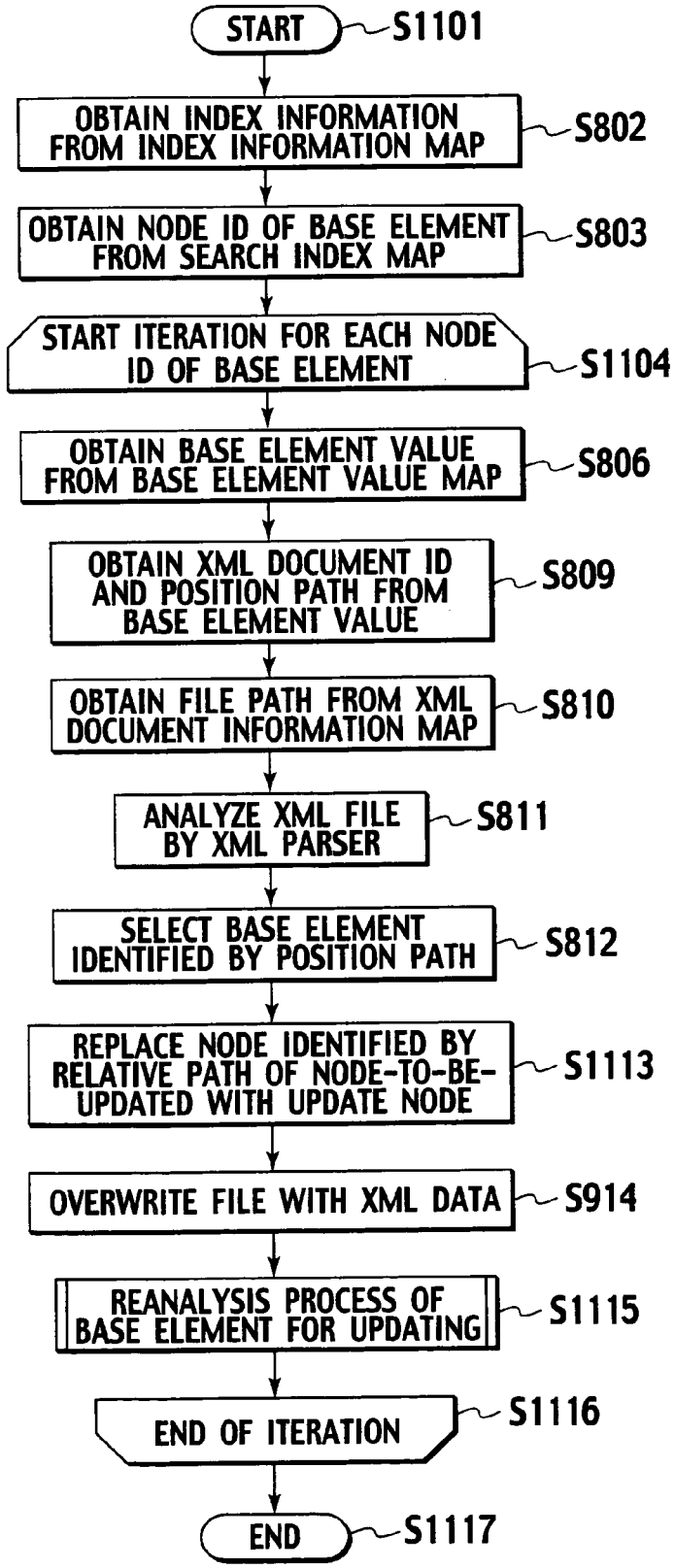
FIG. 11 is a flow chart of an updating process executed by the XML DB program according to the embodiment of the present invention.

FIG. 11 is a flow chart illustrating the update process executed by the XML DB program.

The update process is started (S1101).

The processes of steps S802 and S803 are identical to steps S802 and S803 in the flow chart illustrating the search process executed by the XML DB program of FIG. 8.

Next, a process which is started at step S1104 and finished at step S1116 is repeated for each of the node IDs of the base element obtained in step S803.

The processes of step S806 and steps S809 to S812 are identical to step S806 and steps S809 to S812 in the flow chart illustrating the search process executed by the XML DB program of FIG. 8.

Next, among the nodes below the base element selected in step S812, the node identified by the relative path of the node to be updated is substituted by the update node (S1113). Here, it is assumed that the base element itself will not be updated. In other words, a relative path which identifies the base element itself will not be specified, in the relative path from the base element identifying the node to be updated of the input parameters.

The process of step S914 is identical to step S914 in the flow chart illustrating the deletion process executed by the XML DB program of FIG. 9.

Next, the re-analysis process of the base element to be updated is executed (S1115). Here, the node ID of the base element to be processed in the iteration process, the index information obtained in step S802, the base element value obtained in step S806, the XML document ID obtained in step S809, and the base element obtained in step S812 are passed as input parameters.

The iteration process is finished (S1116).

The update process is finished (S1117).

(Flow of the Re-Analysis Process of the Base Element to be Updated)

Next, the flow of the re-analysis process of step S1115 of the base element to be updated will be described.

Figure 12:
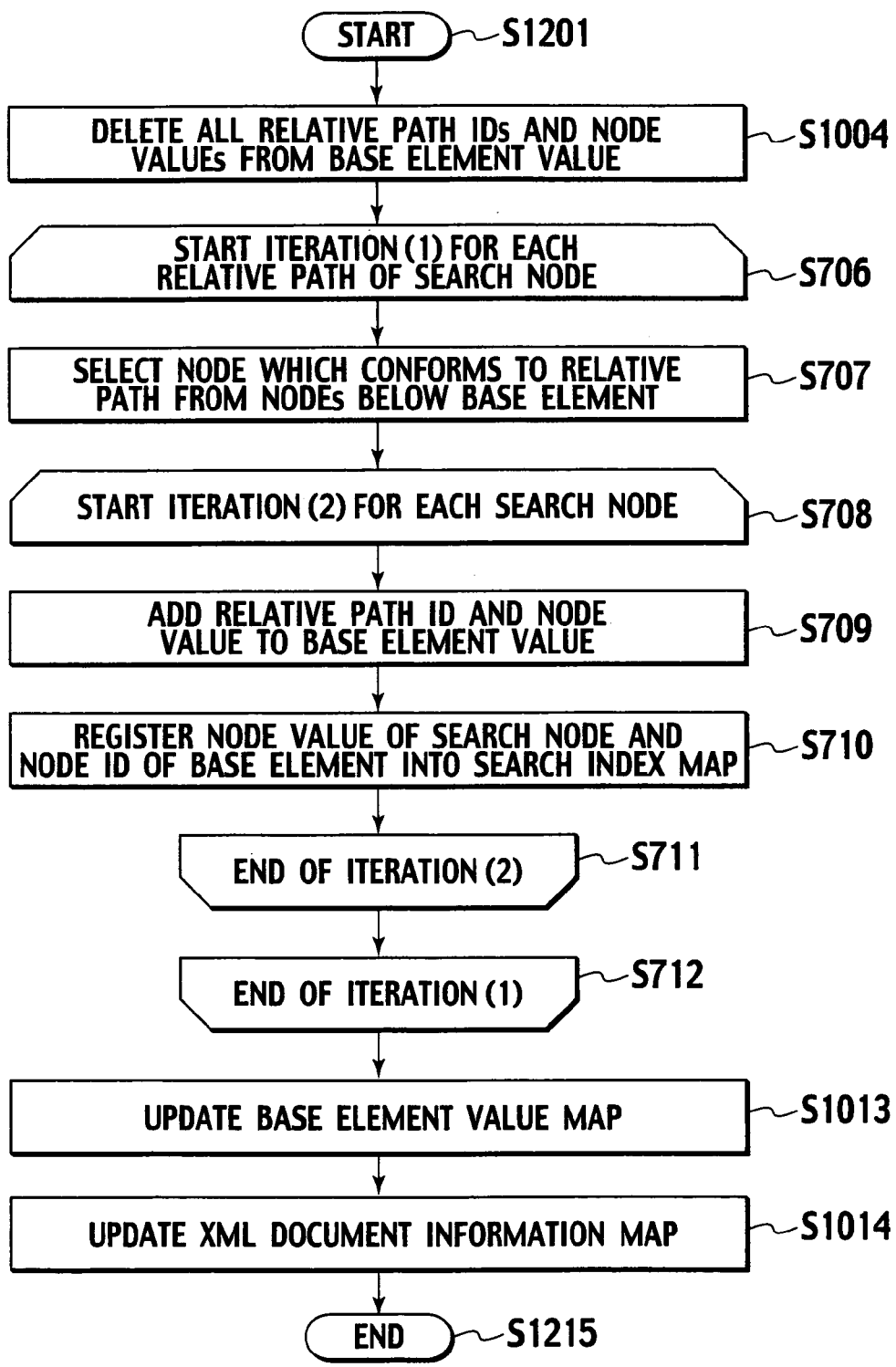
FIG. 12 is a flow chart of a base element re-analysis process for updating by the XML DB program according to the embodiment of the present invention.

FIG. 12 is a flow chart illustrating the re-analysis process of the base element to be updated by the XML DB program.

The base element re-analysis process is started (S1201).

The processes of step S1004, steps S706 to S712, steps S1013 and S1014 are identical to step S1004, steps S706 to S712, steps S1013 and S1014 in the flow chart illustrating the re-analysis process of the base element to be deleted of FIG. 10.

The base element re-analysis process is finished (S1215).

(Flow of the Addition Process)

Next, the flow of an addition process executed by the XML DB program of the present embodiment will be described.

The addition process is executed by the XML DB program according to an instruction from the application program. The file path identifying the XML file to be added, an X path identifying a node to be added, a flag indicating the position of addition for the node to be added, and a new node to be used for addition (referred to as the additional node hereafter) are passed as input parameters.

The flag indicating the position of addition for the node to be added is a flag indicating whether the additional node is added as the last child node of the node to be added (in this case, the node to be added must be an element), or as a sibling node immediately preceding the node to be added.

Figure 13:
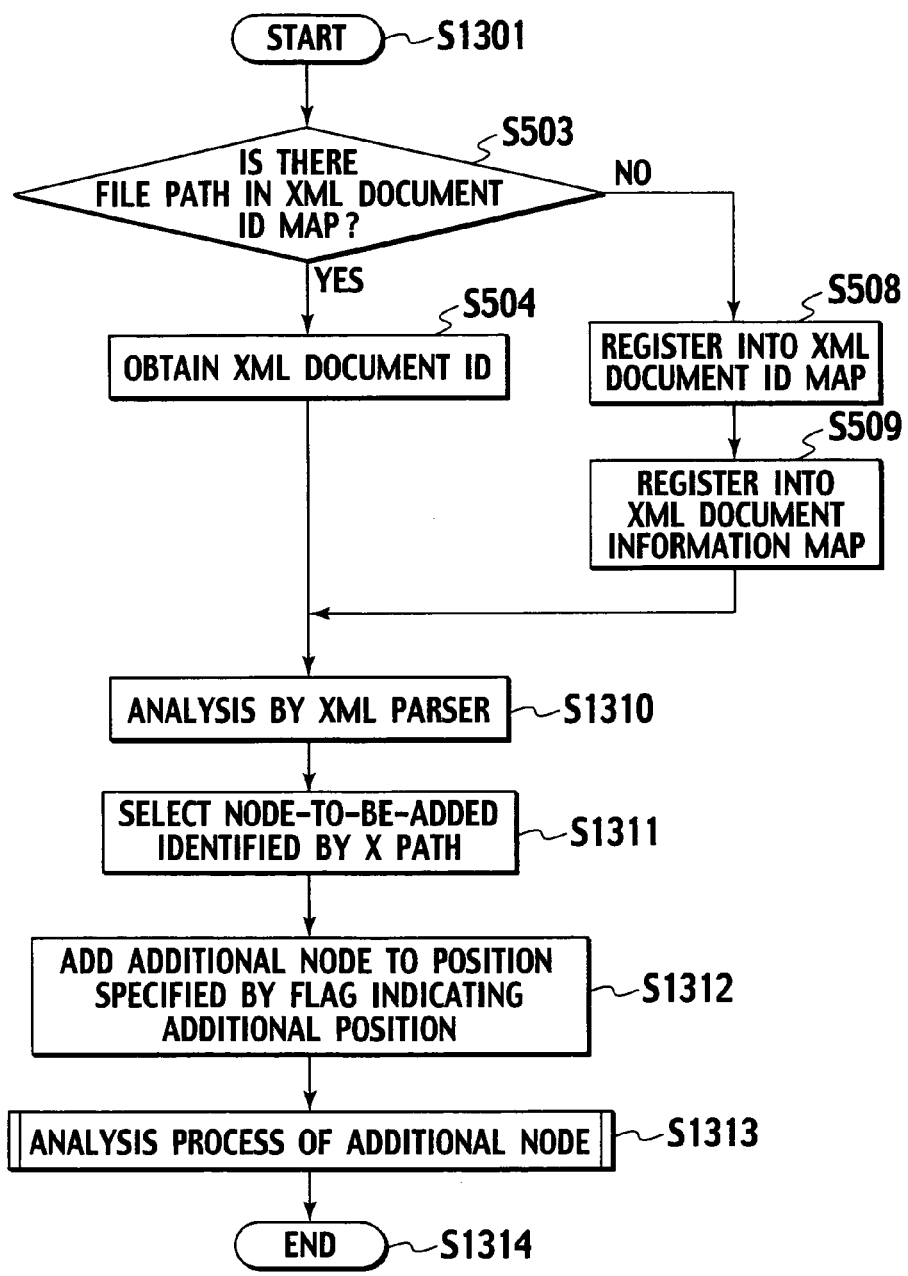
FIG. 13 is a flow chart of an addition process executed by the XML DB program according to the embodiment of the present invention.

FIG. 13 is a flow chart illustrating the addition process executed by the XML DB program.

The addition process is started (S1301).

The processes of steps S503, S504, S508 and S509 are identical to steps S503, S504, S508 and S509 in the flow chart illustrating the XML file analysis decision process of FIG. 5. However, the flow proceeds to step S1310 after step S504, and after step S509.

In step S1310, a file identified by the file path of the input parameters is analyzed by the XML parser.

Next, a node identified by the X path identifying the node to be added of the input parameters is selected from among the XML data analyzed in step S1310 (S1311). Here, it is assumed that there is only one node to be selected. In other words, it is assumed that the X path of the input parameters identifies a single node.

Next, for the node to be added selected in step S1311, an additional node of the input parameters is added to the position specified by the flag indicating the position of addition of the input parameters (S1312).

Next, the additional node analysis process is executed (S1313). Here, the XML document ID obtained in step S504 or created in step S508, and the additional node after having been added in step S1312 are passed as input parameters.

The addition process is finished (S1314).

(Flow of the Additional Node Analysis Process)

Next, the additional node analysis process of step S1313 will be described.

Figure 14:
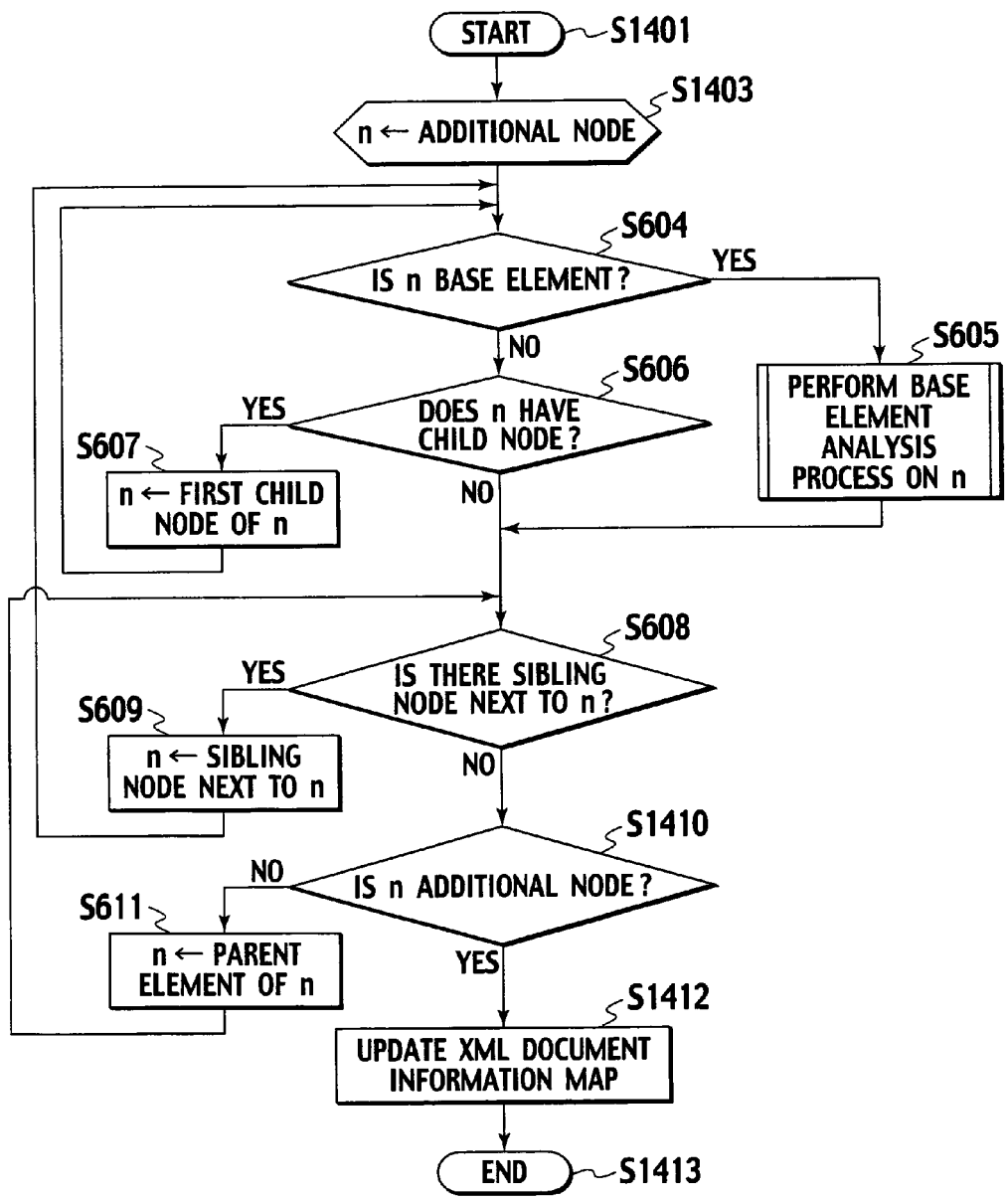
FIG. 14 is a flow chart of an additional nodal analysis process executed by the XML DB program according to the embodiment of the present invention.

FIG. 14 is a flow chart illustrating the additional node analysis process executed by the XML DB program.

The additional node analysis process is started (S1401).

Next, let variable n be the additional node of the input parameters (S1403).

The processes of steps S604 to S609 and step S611 are identical to steps S604 to S609 and step S611 from in flow chart illustrating the XML file analysis process of FIG. 6. However, if it is determined in step S608 that there is no sibling node next to n, the flow proceeds to step S1410.

In step S1410, it is determined whether or not n is an additional node. If it is determined that n is not an additional node the flow proceeds to step S611, whereas the flow proceeds to step S1412 if it is determined that n is an additional node.

In step S1412, the XML document information map is updated. Specifically a value having the XML document ID of the input parameters as its key, i.e., the XML document information is obtained from the XML document information map, the file size and last updated date and time of the file indicated by the file path included in the obtained XML document information are obtained, the XML document information is updated according to the obtained file size and last updated date and time, and the value having the XML document ID of the XML document information map as its key is updated according to the updated XML document information.

The additional node analysis process is finished (S1413).

(Specific Example of the XML Data)

Next, the processes of the present embodiment will be described in further detail using a specific example of the XML data.

FIG. 15 is specific example of the XML data in the present embodiment. Here, the numerals aligned vertically on the left side are line numbers provided for convenience of explanation and are not included in the actual XML data.

The exemplary XML data is in its entirety an element named "SDVideo", which is the root element of the exemplary XML data. Each XML file stores XML data composed of a single root element.

The elements named "Movie" on lines 2 to 6 and lines 7 to 11 store metadata corresponding to a single motion picture file stored in the video camera. Specifically, data such as an ID (id attribute) discriminating a motion picture file, an event type (Event element), image quality (Quality element), or captured date and time (Date element) are stored below the Movie element. In the present embodiment, XML data having a plurality of XML data fragments of an identical structure (referred to as XML data unit hereinafter) are thus stored. Here, although there is one type of XML data unit in the exemplary XML data, there may be a plurality of types of XML data units existing in the XML data.

The Movie element positioned on top of the XML data units corresponds to the base element of the present embodiment. The X path identifying the base element is "/SDVideo/Movie".

Since processes such as search are executed on metadata such as event type or image quality for the motion picture file, the node storing the data is the search node. For example, the node storing the event type is, to be precise, a text node which is a child node of the Event element, with the relative path from the base element identifying the search node being "Event/text( )". Further, the node storing image quality is, to be precise, a text node which is a child node of a Quality element, with the relative path from the base element identifying the search node being "Quality/text( )". Also, the node storing the ID discriminating the motion picture file is an id attribute, with the relative path from the base element identifying the search node being "@ id". A search index map in the index file is prepared for each of the relative paths identifying these search nodes.

For example, when obtaining the ID of a motion picture having the event type of "11" in the search process, an X path "/SDVideo/Movie" identifying the base element, a relative path "@id" from the base element identifying a node of the search result, a relative path "Event/text( )" from the base element identifying the search node, and a search key "11" are passed as input parameters of the search process.

For example, when deleting the entire metadata of the motion picture which has an image quality of "1" in the deletion process, an X path "/SDVideo/Movie" identifying the base element, a relative path "." from the base element (expressing the base element itself) identifying the node to be deleted, a relative path "Quality/text( )" from the base element identifying the search node, and the search key "1" are passed as input parameters of the deletion process. The node to be deleted is substituted by a comment such as that shown in the twelfth line of FIG. 15.

For example, when updating the event type of the motion picture with an ID "001-001" for discriminating the motion picture file to "34", in the update process, an X path "/SDVideo/Movie" identifying the base element, a relative path "Event/text( )" from the base element identifying the node to be updated, an update node (text node having a node value of "34"), a relative path "@id" from the base element identifying the search node, and a search key "001-001" are passed as input parameters of the update process.

For example, when adding metadata of a new motion picture file to end of the XML data of FIG. 15 in the addition process, XML data having a Movie element including the metadata of the new motion picture file as the top node is created first (which will be the additional node), and a file path (file path of the XML file storing the XML data of FIG. 15) identifying the XML file to be added, an X path "/SDVideo" identifying the node to be added, a flag indicating the position of addition for the node to be added (flag indicating the last child node), and the additional node (XML data including the metadata of the new motion picture file) are passed as input parameters of the addition process.

Further, when adding new metadata of the motion picture file before the XML data unit beginning from the thirteenth line of the XML data of FIG. 15, for example, in the addition process, XML data having an Movie element including the metadata of a new motion picture file as its top node is first created (which becomes the additional node), then a file path identifying the XML file to be added (file path of the XML file storing the XML data of FIG. 15), an X path "/SDVideo/Movie[@id='001-003']" indicating the node to be added, a flag indicating the position of addition for the node to be added (flag indicating the immediately preceding sibling node), and an additional node (XML data including the metadata of the new motion picture file) are passed as input parameters of the addition process.

(Summary)

With the aforementioned arrangement, it becomes possible to manage the metadata of a video camera as structured data according to XML.

Further, the present invention includes a program for implementing the functionality of the aforementioned embodiments into a data storage device. These programs may be read from a recording medium and imported into the data storage device, or transmitted via a communication network and imported into the data storage device.

(Details of the Index File)

Next, the arrangement of the database layer of the index file described in FIG. 3 will be described in further detail.

Figure 16:
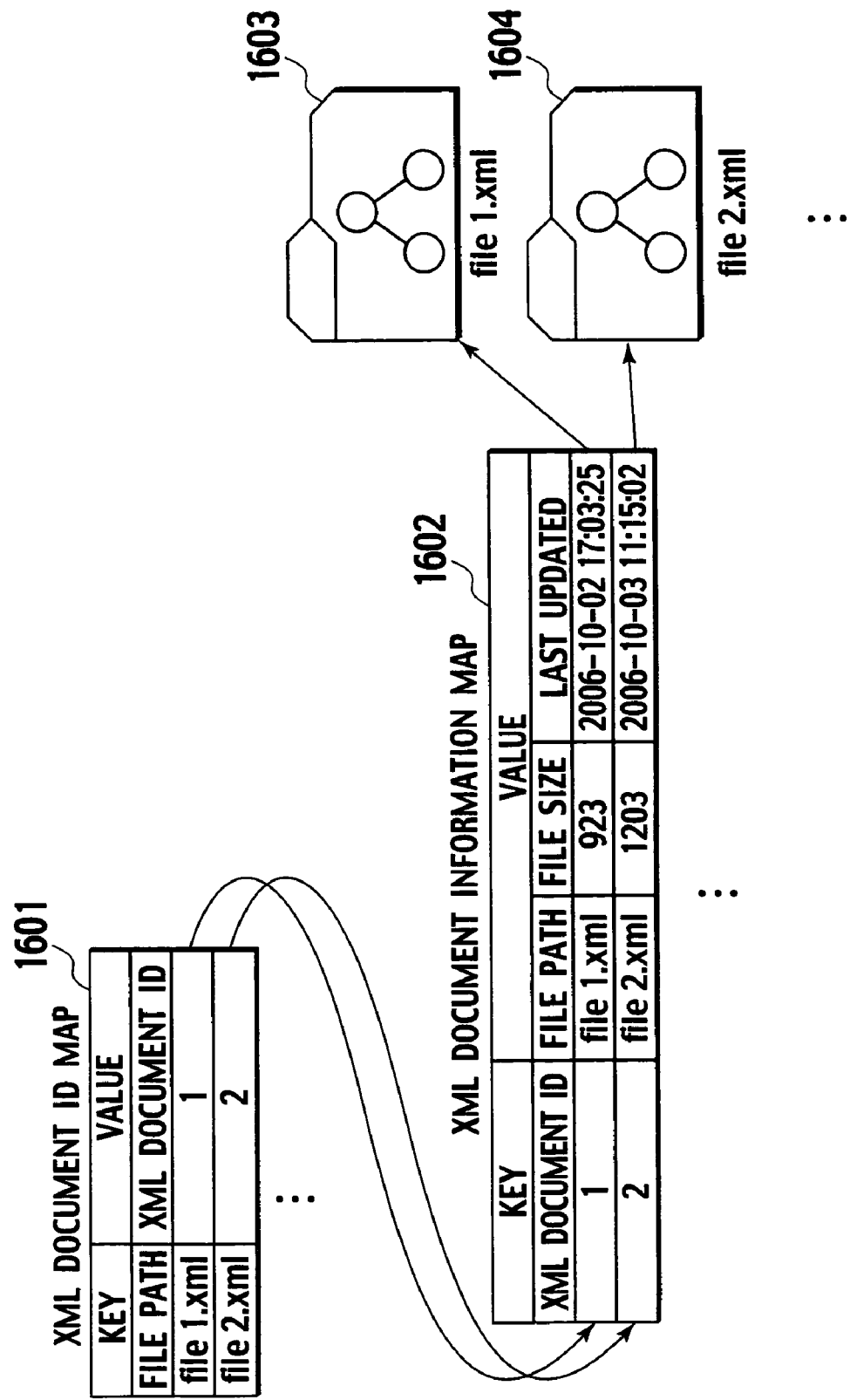
FIG. 16 is a block diagram of an XML document ID map and an XML document information map according to the embodiment of the present invention.

FIG. 16 is a block diagram of the XML document ID map and the XML document information map.

The XML document ID map 1601 is a map having the file path of the XML document as its key and having the XML document ID as its value. In the example of FIG. 16, ID:1 and ID:2 are assigned to file paths "file1.xml" and "file2.xml", respectively.

The XML document information map 1602 is a map having the XML document ID as its key and having the XML document information including the file path, the file size and the last updated date and time of the file as its value. In the example of FIG. 16, information of the XML file 1603 and information of the XML file 1604 are assigned to ID:1 and ID:2, respectively.

Figure 17:
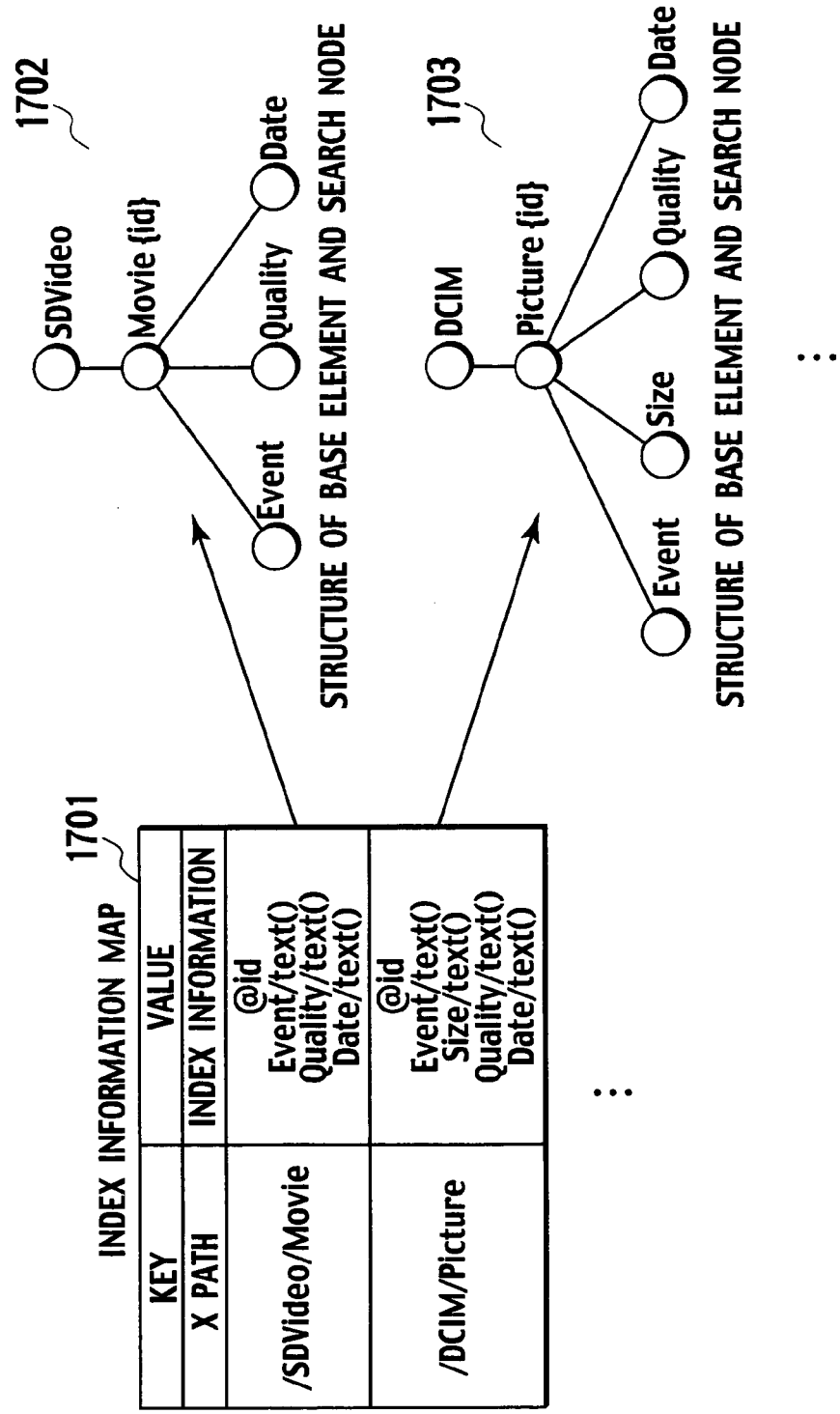
FIG. 17 is a block diagram of an index information map according to the embodiment of the present invention.

FIG. 17 is a block diagram of the index information map.

The Index information map 1701 is a map having the X path of the base element as its key and having the index information as its value. In the example of FIG. 17, the index information map has two records, which store the index information arranged as shown in the arrangements 1702 and 1703 of the base element and the search node, respectively.

In the index information arranged as shown in the arrangement 1702 of the base element and the search node, the root element is SDVideo, the base element is Movie, and the X path of the base element is "/SDVideo/Movie". The search node is a text node which is supposed to be the id attribute of the Movie element, and the child node of respective elements of the Event, the Quality and the Date, with the relative path from their base element Movie being included in the index information.

The same goes for the arrangement 1703 of the base element and the search node.

Figure 18:
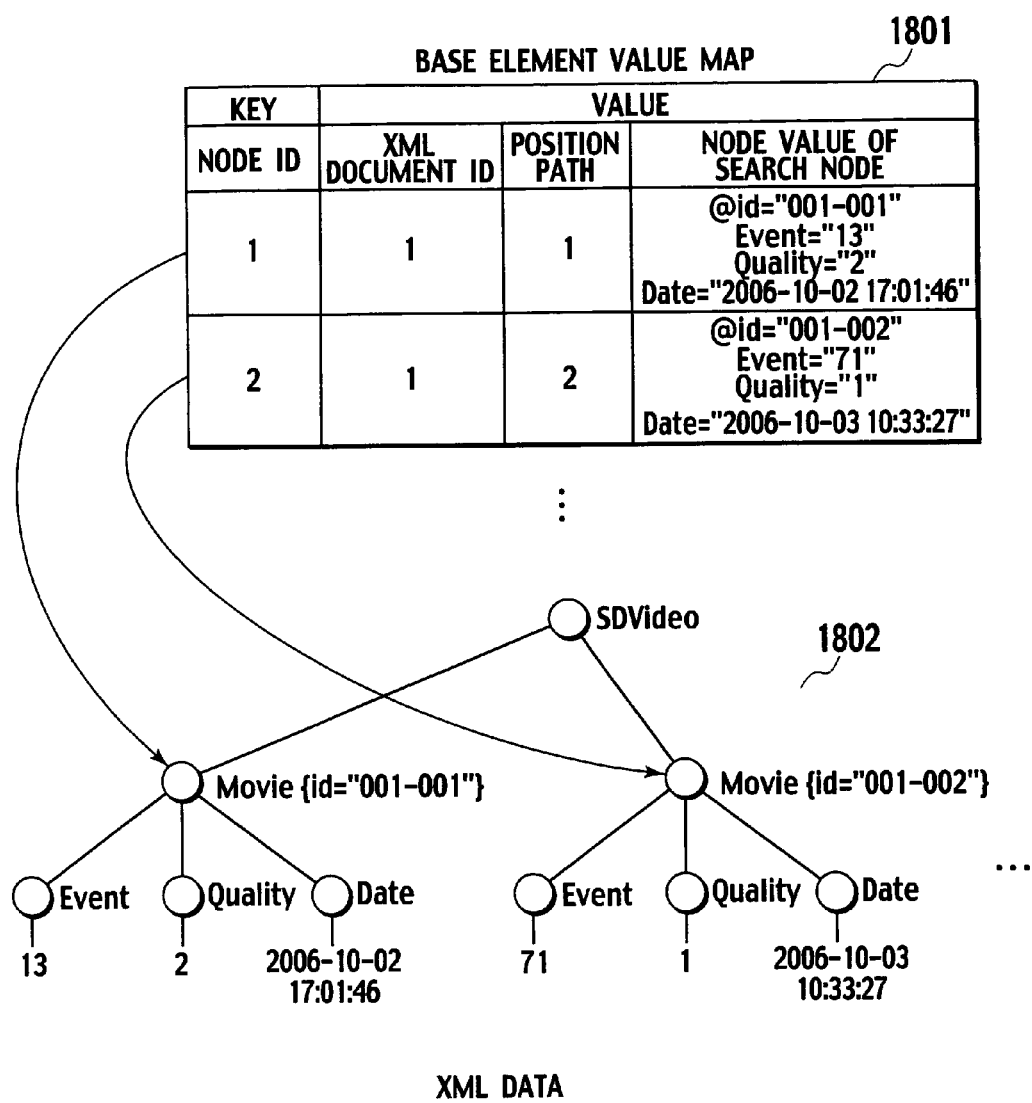
FIG. 18 is a block diagram of a base element value map according to the embodiment of the present invention.

FIG. 18 is a block diagram of the base element value map (first index component).

The base element value map 1801 is a map having the node ID of the base element (information which uniquely discriminates the reference element) as its key, and having, as its values, the base element values comprising the XML document ID (information which identifies the structured data file having structured data including the uniquely discriminated reference element), the position path (information which identifies the position of the reference element in the structured data included in the uniquely discriminated structured data file), the node value of respective search node (information which identifies respective search elements positioned below the reference element and content information of the respective search elements). FIG. 18 is an example with the Movie element of the XML data 1802 being the base element, wherein respective records of the base element value map 1801 store base element values corresponding to respective base elements of the XML data 1802.

Figure 19:
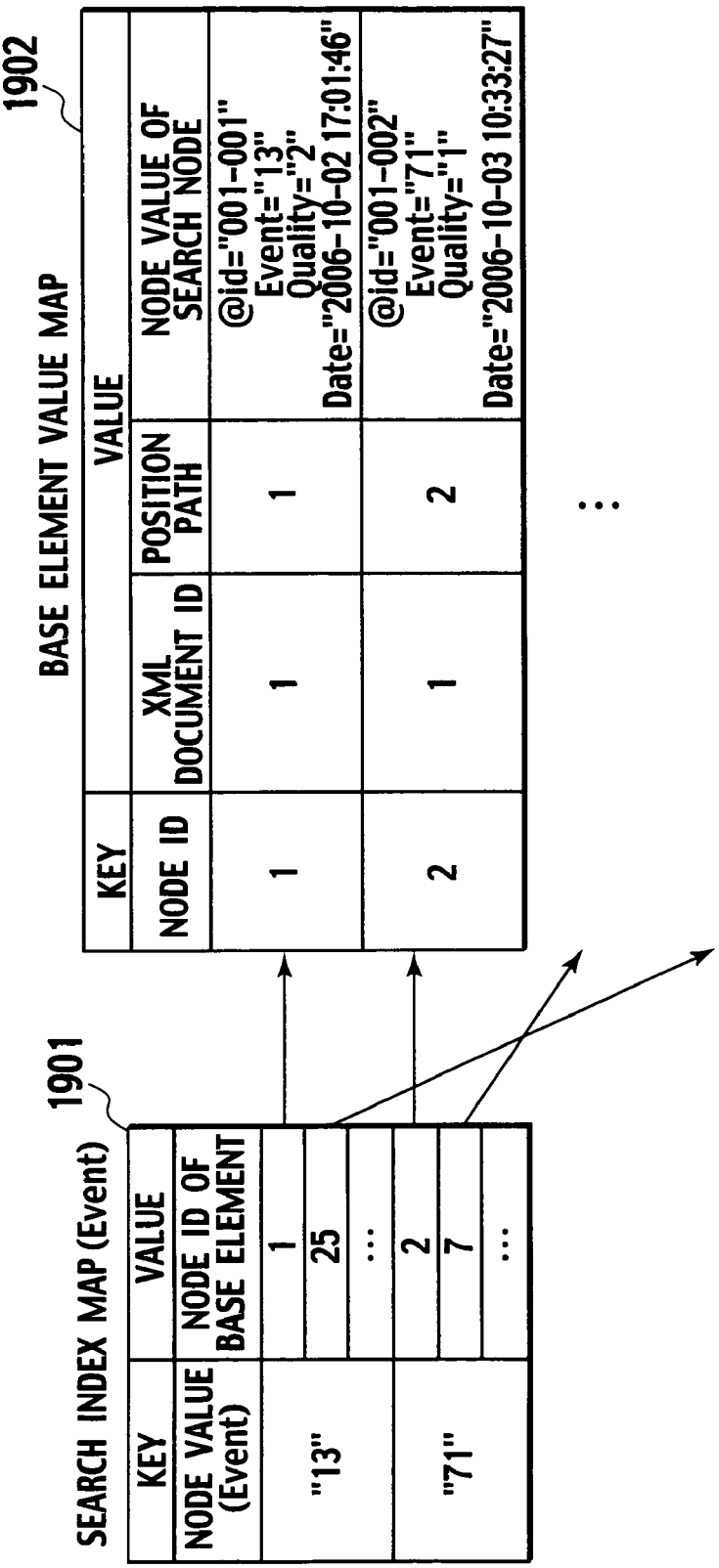
FIG. 19 is a block diagram of a search index map according to the embodiment of the present invention.

FIG. 19 is a block diagram of the search index map (second index component).

The search index map 1901 is a map having the node value of the search node (content information of the search element) as its key and having, as its value, the node ID of a base element which has, as its descendant, a search node having the node value (information which uniquely discriminates the reference element including the search element having the content information). FIG. 19 is an example illustrating an Event element (to be precise, text node which is a child node of the Event element) in which the search node is identified as an Event by information (Event) which identifies a search element, with one or more values are stored for a single type of key. The node ID of the base element stored in the value corresponds to the node ID stored in the key of the base element value map 1902.

(Exemplary Application of the Present Invention)

Next, a specific exemplary application of the embodiment will be described.

Figure 20:
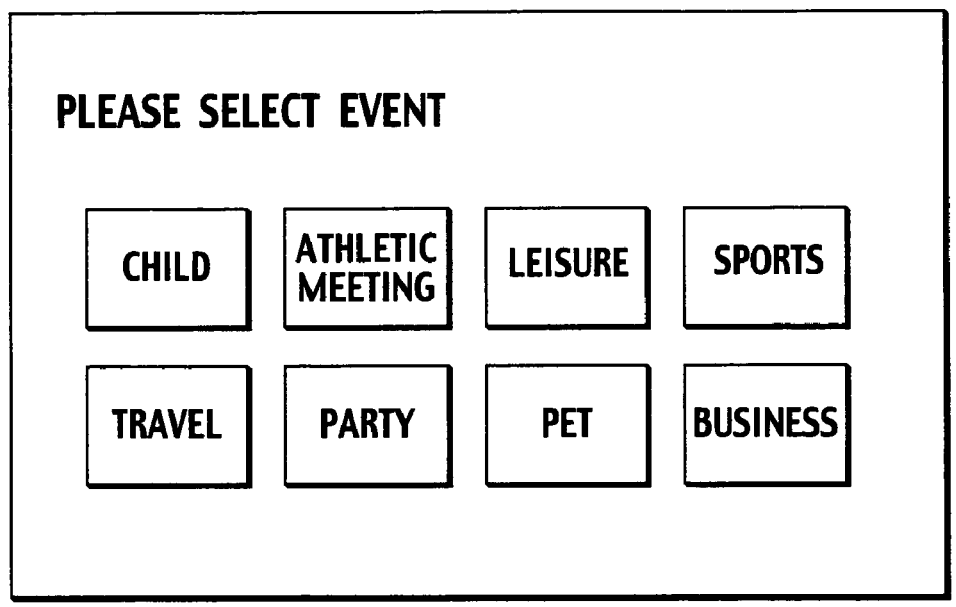
FIG. 20 is a screen displaying a list of events according to the embodiment of the present invention.

FIG. 20 is an exemplary screen of an event list displayed on the LCD monitor of the video camera in the example where a structured data storage device applying the embodiment is used in a video camera.

In the present exemplary application, when the user performs a menu operation for registering events before starting image capturing, a list of events such as "children" or "athletic meeting" preliminarily stored in the device is displayed as shown in FIG. 20. Instead of event names, icons showing the types of events may be displayed.

When the user selects any of the events, the selected event is stored into the device. Subsequently, when the user performs image capturing, the ID of the selected event is stored as a piece of the attribute information of the captured motion picture into the structured data storage device of the present invention.

Next, when the user performs a menu operation for viewing the captured movie, a list of events such as "children" or "athletic meeting" is displayed as shown in FIG. 20.

When the user selects any of the events, a motion picture having the ID of the selected event in the structured data storage device of the present invention is searched, and thumbnails (representative image) of the motion pictures obtained as the search result are displayed as a list as shown in FIG. 21. When the user selects any of the motion pictures from the displayed list of motion picture thumbnails, the selected motion picture is started to play.

What is claimed is:

1. A structured data storage device configured to allow viewing or updating, from an external device, of structured data file stored in a storage medium built in the structured data storage device, comprising:
    a storage means for storing, into the storage medium, the structured data file having structured data, and an index file having index information for use to search the structured data;
    a detecting means for detecting whether or not the stored structured data file has been updated by the external device; and
    an index information generating means for analyzing, when the detecting means detects that the stored structured data file has been updated, the updated structured data file, generate new index information relating to the structured data included in the updated structured data file, and update the stored index file using the new index information,
    wherein the structured data has a plurality of data units identically configured with hierarchically structured elements,
    each data unit comprises a reference element positioned at the top of the respective data units, and one or more search elements positioned below the reference element,
    the index information comprises a first index component and a second index component,
    the first index component links together information which identifies the reference element, information which identifies a structured data file having the structured data comprising the identified reference element, information which identifies the position of the identified reference element in the structured data included in the identified structured data file, information which identifies respective search elements positioned below the identified reference element, and content information of the respective search elements,
    the second index component links together information which identifies respective search elements, content information of the respective search elements, and information which identifies a reference element having the respective search elements,
    the index information generating means detects a reference element included in the structured data in the updated structured data file, analyzes the updated structured data file by detecting a search element positioned below the detected reference element, and generates the new index information comprising a new first index component and a new second index component,
    the index information generating means links together, as the new first index component, information which identifies the detected reference element, information which identifies the updated structured data file having the structured data comprising the identified reference element, information which identifies the position of the identified reference element in the structured data included in the identified structured data file, information which identifies the detected search element positioned below the identified reference element, and content information of the detected search element, and
    the index information generating means links together, as the new second index component, information which identifies the detected search element, content information of the respective search elements, and information which identifies the detected reference element having the respective search elements.

2. The structured data storage device according to claim 1, further comprising a search means for searching the structured data based on the index information, in accordance with externally specified search information,
    wherein the search means:
        specifies a search element and content information of the search element in accordance with the externally specified search information;
        extracts, from the second index component, a pair of information which identifies the specified search element and content information of the specified search element;
        extracts, from the second index component, information which is associated with the extracted pair and identifies the reference element; and
        extracts, from the first index component, content information of at least one of the search elements, the content information being associated with the information which identifies the extracted reference element.

3. The structured data storage device according to claim 1, further comprising a deletion means for deleting elements of the structured data, in accordance with externally specified elements-to-be-deleted information,
wherein the deletion means:
specifies a search element of a candidate for deletion and content information of the search element of the candidate for deletion, in accordance with the externally specified elements-to-be-deleted information;
extracts, from the second index component, a pair of information which identifies the specified search element and content information of the specified search element;
extracts, from the second index component, information which is associated with the extracted pair and identifies the reference element;
extracts, from the first index component, information which identifies the structured data file, the information being associated with the information which identifies the extracted reference element, and information which identifies the position of the reference element;
reads the reference element from the structured data file identified by the information which identifies the extracted structured data file and the information which identifies the position of the extracted reference element;
deletes at least one of the elements positioned below the read reference element; and
causes the storage means to store again the structured data file with the elements already deleted, into the storage medium, and causes the index information generating means to analyze the structured data file with the elements already deleted to update the index information.

4. The structured data storage device according to claim 1, further comprising an update means for updating an element of the structured data, in accordance with externally specified update information,
wherein the update means:
specifies a search element of a candidate to be updated, content information of the search element of the candidate to be updated, element selection condition which specifies the search element of the candidate to be updated, and contents to be updated in accordance with the externally specified update information;
extracts, from the second index component, a pair of information which identifies the specified search element and content information of the specified search element;
extracts, from the second index component, information which is associated with the extracted pair and which identifies the reference element;
extracts, from the first index component, information which identifies the structured data file, the information being associated with the information which identifies the extracted reference element, and information which identifies the position of the reference element;
reads the reference element from the structured data file identified by the information which identifies the extracted structured data file and the information which identifies the position of the extracted reference element;
replaces the content of the element which is positioned below the read reference element and satisfies the element selection condition, in accordance with the contents to be updated; and causes the storage means to store again the structured data file with the elements already updated, into the storage medium, and causes the index information generating means to analyze the structured data file with the elements already updated to update the index information.

5. A structured data storage device comprising:
a storage means for storing a structured data file having structured data into a first storage medium to be removably attached to the structured data storage device, and store an index file having index information for use to search the structured data into a second storage medium built in the structured data storage device;
a detecting means for detecting whether or not the structured data file stored in the first storage medium has been updated by an external device; and
an index information generating means for analyzing, when the detecting means detects that the stored structured data file has been updated, the updated structured data file, generate new index information relating to the structured data included in the updated structured data file, and update the index file stored in the second storage medium using the new index information,
wherein the structured data has a plurality of data units identically configured with hierarchically structured elements,
each data unit comprises a reference element positioned at the top of the respective data units, and one or more search elements positioned below the reference element,
the index information comprises a first index component and a second index component,
the first index component links together information which identifies the reference element, information which identifies the structured data file having the structured data comprising the identified reference element, information which identifies the position of the identified reference element in the structured data included in the identified structured data file, information which identifies respective search elements positioned below the identified reference element, and content information of the respective search elements,
the second index component links together information which identifies respective search elements, content information of the respective search elements, and information which identifies a reference element having the respective search elements,
the index information generating means detects a reference element included in the structured data in the updated structured data file, analyzes the updated structured data file by detecting a search element positioned below the detected reference element, and generates the new index information comprising a new first index component and a new second index component,
the index information generating means links together, as the new first index component, information which identifies the detected reference element, information which identifies the updated structured data file having the structured data comprising the identified reference element, information which identifies the position of the identified reference element in the structured data included in the identified structured data file, information which identifies the detected search element positioned below the identified reference element, and content information of the detected search element, and
the index information generating means links together, as the new second index component, information which identifies the detected search element, content information of the respective search elements, and information which identifies the detected reference element having the respective search elements.

6. The structured data storage device according to claim 5, further comprising a search means for searching the structured data based on the index information, in accordance with externally specified search information, wherein the search means:

specifies a search element and content information of the search element in accordance with the externally specified search information;

extracts, from the second index component, a pair of information which identifies the specified search element and content information of the specified search element;

extracts, from the second index component, information which is associated with the extracted pair and identifies the reference element; and extracts, from the first index component, content information of at least one of the search elements, the content information being associated with the information which identifies the extracted reference element.

7. The structured data storage device according to claim 5, further comprising a deletion means for deleting elements of the structured data, in accordance with externally specified elements-to-be-deleted information, wherein the deletion means:

specifies a search element of a candidate for deletion, and content information of the search element of the candidate for deletion, in accordance with the externally specified elements-to-be-deleted information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

deletes at least one of the elements positioned below the read reference element; and causes the storage means to store again the structured data file with the elements already deleted, into the first storage medium, and causes the index information generating means to analyze the structured data file with the elements already deleted to update the index information.

8. The structured data storage device according to claim 5, further comprising an update means for updating elements of the structured data, in accordance with externally specified update information, wherein the update means:

specifies a search element of a candidate to be updated, content information of the search element of the candidate to be updated, element selection condition which specifies the search element of the candidate to be updated, in accordance with the externally specified update information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

replaces the content of the element which is positioned below the read reference element and satisfies the element selection condition, in accordance with the contents to be updated; and causes the storage means to store again the structured data file with the elements already updated, into the storage medium, and causes the index information generating means to analyze the structured data file with the elements already updated to update the index information.

9. A structured data storage device comprising:

a storage means for storing a structured data file having structured data into a storage medium to be removably attached to the structured data storage device, and store an index file having index information for use to search the structured data into the storage medium;

a detecting means for detecting whether or not the stored structured data file has been updated by an external device; and an index information generating means for analyzing, when the detecting means detects that the stored structured data file has been updated, the updated structured data file, generate new index information relating to the structured data included in the updated structured data file, and update the stored index file using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which identifies the reference element, information which identifies the structured data file having the structured data comprising the identified reference element, information which identifies the position of the identified reference element in the structured data included in the identified structured data file, information which identifies respective search elements positioned below the identified reference element, and content information of the respective search elements, the second index component links together information which identifies respective search elements, content information of the respective search elements, and information which identifies a reference element having the respective search elements, the index information generating means detects a reference element included in the structured data in the updated structured data file, analyzes the updated structured data file by detecting a search element positioned below the detected reference element, and generates the new index information comprising a new first index component and a new second index component, the index information generating means links together, as the new first index component, information which identifies uniquely discriminates the detected reference element, information which identifies the updated structured data file having the structured data comprising the identified reference element, information which identifies the position of the identified reference element in the structured data included in the identified structured data file, information which identifies the detected search element positioned below the identified reference element, and content information of the detected search element, and the index information generating means links together, as the new second index component, information which identifies the detected search element, content information of the respective search elements, and information which identifies the detected reference element having the respective search elements.

10. The structured data storage device according to claim 9, further comprising a search means for searching the structured data based on the index information, in accordance with externally specified search information, wherein the search means:
specifies a search element and content information of the search element in accordance with the externally specified search information;
extracts, from the second index component, a pair of information which identifies the specified search element and content information of the specified search element;
extracts, from the second index component, information which is associated with the extracted pair and identifies the reference element; and
extracts, from the first index component, content information of at least one of the search elements, the content information being associated with the information which identifies the extracted reference element.

11. The structured data storage device according to claim 9, further comprising a deletion means for deleting elements of the structured data, in accordance with externally specified elements-to-be-deleted information, wherein the deletion means:
specifies a search element of a candidate for deletion, and content information of the search element of the candidate for deletion, in accordance with the externally specified elements-to-be-deleted information;
extracts, from the second index component, a pair of information which identifies the specified search element and content information of the specified search element;
extracts, from the second index component, information which is associated with the extracted pair and identifies the reference element;
extracts, from the first index component, information which identifies the structured data file, the information being associated with the information which identifies the extracted reference element, and information which identifies the position of the reference element;
reads the reference element from the structured data file identified by the information which identifies the extracted structured data file and the information which identifies the position of the extracted reference element;
deletes at least one of the elements positioned below the read reference element; and
causes the storage means to store again the structured data file with the elements already deleted, into the first storage medium, and causes the index information generating means to analyze the structured data file with the elements already deleted to update the index information.

12. The structured data storage device according to claim 9, further comprising an update means for updating elements of the structured data, in accordance with externally specified update information, wherein the update means:
specifies a search element of a candidate to be updated, content information of the search element of the candidate to be updated, element selection condition which specifies the search element of the candidate to be updated, in accordance with the externally specified update information;
extracts, from the second index component, a pair of information which identifies the specified search element and content information of the specified search element;
extracts, from the second index component, information which is associated with the extracted pair and identifies the reference element;
extracts, from the first index component, information which identifies the structured data file, the information being associated with the information which identifies the extracted reference element, and information which identifies the position of the reference element;
reads the reference element from the structured data file identified by the information which identifies the extracted structured data file and the information which identifies the position of the extracted reference element;
replaces the content of the element which is positioned below the read reference element and satisfies the element selection condition, in accordance with the contents to be updated; and
causes the storage means to store again the structured data file with the elements already updated, into the storage medium, and causes the index information generating means to analyze the structured data file with the elements already updated to update the index information.

13. A structured data storage method in a structured data storage device which allows viewing or updating, from an external device, of structured data file stored in a storage medium built in the structured data storage device, comprising the steps of:

storing, into the storage medium, the structured data file having structured data, and an index file having index information for use to search the structured data;
detecting whether or not the stored structured data file has been updated by the external device; and
analyzing, when the detection step detects that the stored structured data file has been updated, the updated structured data file, generating new index information relating to the structured data included in the updated structured data file, and updating the stored index file using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which identifies the reference element, information which identifies the structured data file having the structured data comprising the identified reference element, information which identifies the position of the identified reference element in the structured data included in the identified structured data file, information which identifies respective search elements positioned below the identified reference element, and content information of the respective search elements, the second index component links together information which identifies respective search elements, content information of the respective search elements, and information which identifies a reference element having the respective search elements, the index information generating step detects a reference element included in the structured data included in the updated structured data file, analyzes the updated structured data file by detecting a search element positioned below the detected reference element, and generates the new index information comprising a new first index component and a new second index component, the index information generating step links together, as the new first index component, information which identifies the detected reference element, information which identifies the updated structured data file having the structured data comprising the identified reference element, information which identifies the position of the identified reference element in the structured data included in the identified structured data file, information which identifies the detected search element positioned below the identified reference element, and content information of the detected search element, and the index information generating step links together, as the new second index component, information which identifies the detected search element, content information of the respective search elements, and information which identifies the detected reference element having the respective search elements.

14. The structured data storage method according to claim 13, further comprising a step of searching the structured data based on the index information, in accordance with externally specified search information, wherein the search step:

specifies a search element and content information of the search element in accordance with the externally specified search information;

extracts, from the second index component, a pair of information which identifies the specified search element and content information of the specified search element;

extracts, from the second index component, information which is associated with the extracted pair and identifies the reference element; and extracts, from the first index component, content information of at least one of the search elements, the content information being associated with the information which identifies the extracted reference element.

15. The structured data storage method according to claim 13, further comprising a deletion step of deleting elements of the structured data, in accordance with externally specified elements-to-be-deleted information, wherein the deletion step:

specifies a search element of a candidate for deletion, and content information of the search element of the candidate for deletion, in accordance with the externally specified elements-to-be-deleted information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

deletes at least one of the elements positioned below the read reference element; and causes the storage step to store again the structured data file with the elements already deleted, into the storage medium, and causes the index information generating step to analyze the structured data file with the elements already deleted to update the index information.

16. The structured data storage method according to claim 13, further comprising an update step of updating elements of the structured data, in accordance with externally specified update information, wherein the update step:

specifies a search element of a candidate to be updated, content information of the search element of the candidate to be updated, element selection condition which specifies the search element of the candidate to be updated, in accordance with the externally specified update information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

replaces the content of the element which is positioned below the read reference element and satisfies the element selection condition, in accordance with the contents to be updated; and causes the storage step to store again the structured data file with the elements already updated, into the storage medium, and causes the index information generating step to analyze the structured data file with the elements already updated to update the index information.

17. A structured data storage method in a structured data storage device which stores structured data file in a storage medium, comprising the steps of:

storing the structured data file having structured data into a first storage medium to be removably attached to the structured data storage device, and storing an index file having index information for use to search the structured data into a second storage medium built in the structured data storage device;

detecting whether or not the structured data file stored in the first storage medium has been updated by an external device; and analyzing, when the detection step detects that the stored structured data file has been updated, the updated structured data file, generating new index information relating to the structured data included in the updated structured data file, and updating the index file stored in the second storage medium using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which identifies the reference element, information which identifies the structured data file having the structured data comprising the identified reference element, information which identifies the position of the identified reference element in the structured data included in the identified structured data file, information which identifies respective search elements positioned below the identified reference element, and content information of the respective search elements, the second index component links together information which identifies respective search elements, content information of the respective search elements, and information which identifies a reference element having the respective search elements, the index information generating step detects a reference element included in the structured data in the updated structured data file, analyzes the updated structured data file by detecting a search element positioned below the detected reference element, and generates the new index information comprising a new first index component and a new second index component, the index information generating step links together, as the new first index component, information which identifies the detected reference element, information which identifies the updated structured data file having the structured data comprising the identified reference element, information which identifies the position of the identified reference element in the structured data included in the identified structured data file, information which identifies the detected search element positioned below the identified reference element, and content information of the detected search element, and the index information generating step links together, as the new second index component, information which identifies the detected search element, content information of the respective search elements, and information which identifies the detected reference element having the respective search elements.

18. The structured data storage method according to claim 17, further comprising a step of searching the structured data based on the index information, in accordance with externally specified search information, wherein the search step:

specifies a search element and content information of the search element in accordance with the externally specified search information;

extracts, from the second index component, a pair of information which identifies the specified search element and content information of the specified search element;

extracts, from the second index component, information which is associated with the extracted pair and identifies the reference element; and extracts, from the first index component, content information of at least one of the search elements, the content information being associated with the information which identifies the extracted reference element.

19. The structured data storage method according to claim 17, further comprising a deletion step of deleting elements of the structured data, in accordance with externally specified elements-to-be-deleted information, wherein the deletion step:

specifies a search element of a candidate for deletion, and content information of the search element of the candidate for deletion, in accordance with the externally specified elements-to-be-deleted information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

deletes at least one of the elements positioned below the read reference element; and causes the storage step to store again the structured data file with the elements already deleted, into the first storage medium, and causes the index information generating step to analyze the structured data file with the elements already deleted to update the index information.

20. The structured data storage method according to claim 17, further comprising an update step of updating elements of the structured data, in accordance with externally specified update information, wherein the update step:

specifies a search element of a candidate to be updated, content information of the search element of the candidate to be updated, element selection condition which specifies the search element of the candidate to be updated, in accordance with the externally specified update information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

replaces the content of the element which is positioned below the read reference element and satisfies the element selection condition, in accordance with the contents to be updated; and causes the storage step to store again the structured data file with the elements already updated, into the storage medium, and causes the index information generating step to analyze the structured data file with the elements already updated to update the index information.

21. A structured data storage method in a structured data storage device which stores structured data file in a storage medium, comprising the steps of:

storing the structured data file having structured data into a storage medium to be removably attached to the structured data storage device, and storing an index file having index information for use to search the structured data into the storage medium;

detecting whether or not the stored structured data file has been updated by an external device; and analyzing, when the detection step detects that the stored structured data file has been updated, the updated structured data file, generating new index information relating to the structured data included in the updated structured data file, and updating the stored index file using the new index information, wherein the structured data has a plurality of data units identically configured with hierarchically structured elements, each data unit comprises a reference element positioned at the top of the respective data units, and one or more search elements positioned below the reference element, the index information comprises a first index component and a second index component, the first index component links together information which identifies the reference element, information which identifies the structured data file having the structured data comprising the identified reference element, information which identifies the position of the identified reference element in the structured data included in the identified structured data file, information which identifies respective search elements positioned below the identified reference element, and content information of the respective search elements, the second index component links together information which identifies respective search elements, content information of the respective search elements, and information which identifies a reference element having the respective search elements, the index information generating step detects a reference element included in the structured data in the updated structured data file, analyzes the updated structured data file by detecting a search element positioned below the detected reference element, and generates the new index information comprising a new first index component and a new second index component, the index information generating step links together, as the new first index component, information which identifies the detected reference element, information which identifies the updated structured data file having the structured data comprising the identified reference element, information which identifies the position of the identified reference element in the structured data included in the identified structured data file, information which identifies the detected search element positioned below the identified reference element, and content information of the detected search element, and the index information generating step links together, as the new second index component, information which identifies the detected search element, content information of the respective search elements, and information which identifies the detected reference element having the respective search elements.

22. The structured data storage method according to claim 21, further comprising a step of searching the structured data based on the index information, in accordance with externally specified search information, wherein the search step:

specifies a search element and content information of the search element in accordance with the externally specified search information;

extracts, from the second index component, a pair of information which identifies the specified search element and content information of the specified search element;

extracts, from the second index component, information which is associated with the extracted pair and identifies the reference element; and extracts, from the first index component, content information of at least one of the search elements, the content information being associated with the information which identifies the extracted reference element.

23. The structured data storage method according to claim 21, further comprising a deletion step of deleting elements of the structured data, in accordance with externally specified elements-to-be-deleted information, wherein the deletion step:

specifies a search element of a candidate for deletion, and content information of the search element of the candidate for deletion, in accordance with the externally specified elements-to-be-deleted information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

deletes at least one of the elements positioned below the read reference element; and causes the storage step to store again the structured data file with the elements already deleted, into the first storage medium, and causes the index information generating step to analyze the structured data file with the elements already deleted to update the index information.

24. The structured data storage method according to claim 21, further comprising an update step of updating elements of the structured data, in accordance with externally specified update information, wherein the update step:

specifies a search element of a candidate to be updated, content information of the search element of the candidate to be updated, element selection condition which specifies the search element of the candidate to be updated, in accordance with the externally specified update information;

extracts, from the second index component, a pair of information which identifies the specified search element and content information of the specified search element;

extracts, from the second index component, information which is associated with the extracted pair and identifies the reference element;

extracts, from the first index component, information which identifies the structured data file, the information being associated with the information which identifies the extracted reference element, and information which identifies the position of the reference element;

reads the reference element from the structured data file identified by the information which identifies the extracted structured data file and the information which identifies the position of the extracted reference element;

replaces the content of the element which is positioned below the read reference element and satisfies the element selection condition, in accordance with the contents to be updated; and causes the storage step to store again the structured data file with the elements already updated, into the storage medium, and causes the index information generating step to analyze the structured data file with the elements already updated to update the index information.

* * * * *